United States Patent [19]
Wang et al.

[11] Patent Number: 5,745,739
[45] Date of Patent: Apr. 28, 1998

[54] VIRTUAL COORDINATE TO LINEAR PHYSICAL MEMORY ADDRESS CONVERTER FOR COMPUTER GRAPHICS SYSTEM

[75] Inventors: Erh-Chiao Wang, Taoyuan; Wei-Kuo Chia, Hsinchu; Chun-Yang Cheng, Taipei, all of Taiwan

[73] Assignee: Industrial Technology Research Institute, Hsinchu, Taiwan

[21] Appl. No.: 598,522

[22] Filed: Feb. 8, 1996

[51] Int. Cl.$^6$ .................................................. G06F 12/06
[52] U.S. Cl. .......................... 395/516; 395/513; 395/525; 395/413
[58] Field of Search ..................................... 395/501, 507, 395/513, 515, 516, 525, 412, 413; 345/200, 191, 189, 185

[56] References Cited

U.S. PATENT DOCUMENTS

| | | | |
|---|---|---|---|
| 5,046,023 | 9/1991 | Katsura et al. | 395/505 |
| 5,185,856 | 2/1993 | Alcorn et al. | 395/130 |
| 5,222,205 | 6/1993 | Larson et al. | 395/130 |
| 5,268,681 | 12/1993 | Lin et al. | 345/200 |
| 5,268,682 | 12/1993 | Yang et al. | 345/200 |
| 5,321,425 | 6/1994 | Chia et al. | 345/200 |
| 5,422,657 | 6/1995 | Wang et al. | 345/186 |
| 5,594,854 | 1/1997 | Baldwin et al. | 395/501 |
| 5,596,686 | 1/1997 | Duluk, Jr. et al. | 395/515 |

OTHER PUBLICATIONS

L. Williams, *Pyramidal Parametrics*, Computer Graphics, vol. 17, No. 3, pp. 1–11, Jul., 1983.

W. Newman & R. Sproull, Principles of Interactive Computer Graphics, ch. 25, pp. 389–410 (1979).

*Primary Examiner*—Kee M. Tung
*Attorney, Agent, or Firm*—Meltzer, Lippe, Goldstein, et al.

[57] ABSTRACT

An address generator is disclosed for performing 2-D virtual coordinate to linear physical memory address conversion. The address generator has an edge walking circuit which receives a 2-D virtual coordinate of a first pixel on a first edge of an object displayed on the display screen. The edge walking circuit selectively outputs a 2-D virtual coordinate of a second pixel which intercepts the first edge of the object at an adjacent pixel row or column to the first pixel. The address generator also has a span expansion circuit which receives the 2-D virtual coordinate of the second pixel. The span expansion circuit selectively expands the 2-D virtual coordinate of the second pixel, according to the number of bits used to represent each pixel and the amount of information which can be accessed at a time from memory. This produces first and second expanded coordinates of the second pixel. Furthermore, the address generator has a linear address circuit which receives the first and second expanded coordinates of the second pixel. The linear address circuit outputs a linear physical address of the second pixel in memory.

12 Claims, 5 Drawing Sheets

VIRTUAL COORDINATE TO LINEAR PHYSICAL MEMORY ADDRESS CONVERTER FOR COMPUTER GRAPHICS SYSTEM

RELATED APPLICATIONS

The following patents and patent applications are commonly assigned to the assignee of this application and contain subject matter related to this application:

1. U.S. patent application Ser. No. 08/598,523, entitled, "Rip Map/Mip Map Textured Address Generator," filed for Ruen-Rone Lee, Chun-Kai Huang and Wei-Kuo Chia on even date herewith;

2. U.S. patent application Ser. No. 08/598,520, entitled, "Blending Apparatus for Computer Graphics System," filed for Jan-Han Hsiao, Wei-Kuo Chia and Chun-Kai Huang on even date herewith;

3. U.S. patent application Ser. No. 08/598,521, entitled "Texture Filter Apparatus for Computer Graphics System," filed for Yu-Ming Lin, Chun-Kai Huang, Wei-Kuo Chia on even date herewith now U.S. Pat. No. 5,740,344;

4. U.S. Pat. No. 5,422,657, entitled, "A Graphics Memory Architecture for Multi-mode Display System," filed for Shu-Wei Wang, Wei-Kuo Chia, Chun-Kai Huang and Chun-Chie Hsiao on Sep. 13, 1993;

5. U.S. Pat. No. 5,321,425, entitled, "Resolution Independent Screen Refresh Strategy," filed for Wei-Kuo Chia, Jiunn-Min Jue, Gen-Hong Chen and Chih-Yuan Liu on Feb. 19, 1992;

6. U.S. Pat. No. 5,268,682, entitled, "Resolution Independent Raster Display System," filed for Wen-Jann Yang, Chih-Yuan Liu and Bor-Chuan Kuo on Oct. 7, 1991; and 7. U.S. Pat. No. 5,268,681, entitled, "Memory Architecture With Graphics generator Including A Divide By Five Divider," filed for Cheun-Song Lin, Bor-Chuan Kuo and Rong-Chung Chen on Oct. 7, 1991.

The contents of the above-listed patents and patent applications are incorporated herein by reference.

FIELD OF THE INVENTION

The present invention relates to graphics controllers and displays of computer systems. In particular, the present invention relates to an address generator for calculating linear physical memory addresses of pixels displayed on a screen of a display device from the virtual coordinates of the pixels on the screen.

BACKGROUND OF THE INVENTION

FIG. 1 depicts a conventional computer system 10. The computer system 10 has a processor 12, a main memory 14, a disk memory 16 and an input device 18, such as a keyboard and mouse. The devices 12–18 are connected to a bus 20 which transfers data, i.e., instructions and information, between each of these devices 12–18. A graphics controller 30 is also connected to the bus 20. As shown, the graphics controller 30 includes a drawing processor 32. The drawing processor 32 is also connected to an address generator 36 and a data input of a frame buffer 34. The address generator 36, in turn, is connected to RAS (row address select), CAS (column address select) and chip select inputs of the frame buffer 34. The frame buffer 34 is connected to a display device 38, such as a cathode ray tube (CRT) or liquid crystal display (LCD) monitor.

The drawing processor 32 receives instructions from the processor 12 for drawing objects. For instance, in the case of a computer aided design (CAD) application, the processor 12 may receiver user input regarding creating and locating objects in 3-D space. The processor 12, in turn, transfers instructions regarding the size, location, texture, translucence, etc. of such objects to the drawing processor 32. In response, the drawing processor 32 creates a pixel image representation of a plane of view of such objects in 3-D space. The pixels of the image of each plane of view form part of a frame that is stored by the drawing processor 32 in the frame buffer 34. Several drawing processors 32 are known, such as is disclosed in U.S. Pat. Nos. 5,046,023 and 5,185,856. The latter reference discloses a drawing processor that is specifically adapted for rendering 3-D objects.

The drawing processor 32 may perform a variety of functions in rendering both 3-D and 2-D objects such as:

(1) draw a line (2) bitblt (bit block line transfer)

(3) draw a triangle (4) mapping texture onto objects (5) rotating/mirroring the image of 2-D objects (6) scaling images; shearing.

Each of these functions is described in greater detail below.

(1) Line Drawing—Edge Walking

Referring to FIG. 2, the drawing of a line on a display screen of a display device 38 is depicted. The display screen has a two-dimensional coordinate system with orthogonal coordinate axes X and Y. Generally, the starting point coordinates $(x_{ls}, y_{ls})$ and ending point coordinates $(x_{le}, y_{le})$ of the line are known ahead of time or determined by drawing processor 32. Starting from the starting point $(x_{ls}, y_{ls})$, the drawing processor 32 fills each pixel that falls on the line that extends between starting point $(x_{ls}, y_{ls})$ and end point $(x_{le}, y_{le})$. This can be done in a number of ways. However, the most common method is referred to as "edge-walking". According to "edge-walking" the drawing processor 32 determines the slope of the line. The slope contains an X-coordinate increment or decrement and a Y-coordinate increment or decrement. The slope may be fractional; however, the pixel coordinates on the screen are discrete. Illustratively, the drawing processor 32 determines in which axis direction (X or Y) the starting point and ending point are closest (by determining which is smaller: $|x_{ls}-x_{le}|$ or $|y_{ls}-y_{le}|$) or arbitrarily selects one axis direction. For instance, suppose, the drawing processor 32 selects the X axis direction.

Coordinate variables (x,y) are set equal to $(x_{ls},y_{ls})$. The drawing processor 32 then determines which other values of x for the column $x=x_{ls}$ should be filled with a pixel. This can be done by first normalizing the slope in the Y-axis direction. The rounded value of the sum of x plus the normalized slope (less one) indicates the maximum value of $x_1$ for row $y=y_{ls}$ which should be filled. The drawing processor 32 thus fills each pixel from $(x_{ls},y_{ls})$ to $(x_1,y_{ls})$. The drawing processor 32 then increments/decrements y by one (y is incremented if $y_{ls}<y_{le}$; y is decremented if $y_{le}<y_{ls}$). The drawing processor 32 then repeats the pixel filling process. This process is repeated for each value of y up until, and including $y_{le}$.

In the process illustrated above, the drawing proceeds by incrementing/decrementing the y coordinate by one and filling each appropriate x coordinate for that fixed y coordinate. Herein, selection of the Y-axis direction for increment/decrement is referred to as "Y-major order" while selection of the X-axis direction for increment/decrement is referred to as "X-major order".

(2) BitBlt

"Bitblt" is the process of copying a rectangular area of pixels from one memory area to another. For instance, a bitblt may be used to transfer a rectangular area from one place of the frame buffer 38 to another. This would move the rectangular area from one place on the display screen to another. Alternatively, bitblt could be used to transfer the rectangular area of pixels between two memories, for instance, between the main memory 14 and frame buffer 34. Illustratively, this is achieved by moving each row of pixels row by row in X-major order (or each column, column by column, in Y-major order) as illustrated in FIG. 3.

Note that the amount of pixel data that can be accessed at any cycle during a bitblt operation is a function of the manner in which the memory is organized. Consider that in order to display pixels at a resolution of 1024×768 at 60 frames per second or a higher scan rate, the pixel data must be retrieved from the frame buffer 38 with access times of 20 nsec and lower. However, common VRAMs used to form the frame buffer 38 have an access time of 35 nsec or higher. To overcome this speed limitation, it is common to interleave the data amongst the frame buffer VRAMs. For example, the VRAMs of the frame buffer 38 may be divided into two sets. Every odd ordinalled pixel on a row of the display screen is stored in the first set, while every even ordinalled pixel on a row of the display screen is stored in the second set. That is, the first, third, fifth, . . . pixels on a display screen row are stored in the first set of VRAMs while the second, fourth, sixth, . . . pixels on the display screen row are stored in the second set of VRAMs. The pixels of a row are then retrieved alternately from the first and second sets of VRAMs. By appropriate scheduling of the alternate accesses, pixels may be retrieved from the frame buffer 38 at a nominal access time of approximately one half that of an individual VRAM. To achieve even lower nominal access times, the VRAMs may be divided into more than two sets.

The VRAMs may also accommodate block transfers, i.e., block write operations. Other memory architectures may be able to perform block read transfers. In such operations, data is transferred to the VRAMs in bursts of up to, e.g., 64 bits (128 bits if the pixel data is interleaved into two sets of VRAMs). Block write operations are advantageous as they permit the issuance of a request to transfer a large amount of data in a single cycle. (Typically, the actual transfer of data to or from the VRAMs takes more than one cycle.)

(3) Triangle Drawing

The drawing of a triangle is fairly important in the context of 3-D rendering. Typically, the surface of a 3-D object to be rendered is divided into plural triangles. Each triangle is oriented in 3-D space. The image of each triangle, as viewed from a chosen plane of view, is then projected onto the chosen plane of view (unless the image of the triangle is blocked by the image of another triangle, e.g., a closer triangle). The image of each triangle is also a triangle.

In drawing a triangle, the drawing processor 32 utilizes certain aspects of both the line drawing and bitblt processes described above. This is illustrated in FIG. 4. Starting from a starting point $(x_{ts},y_{ts})$ the drawing processor 32 utilizes edge walking to determine a first point $(x_1,y_1)$ adjacent to the starting point $(x_{ts},y_{ts})$ which is at a vertex of a triangle 40 to be drawn. The point $(x_1,y_1)$ is on a first edge or line 41 of the triangle 40. The drawing processor 32 also utilizes edge walking to determine a second point $(x_2,y_2)$ on a second line 42 of the triangle 40. In the case of X-major order, $y_1=y_2$; in the case of Y-major order $x_1=x_2$. The drawing processor 32 then fills each pixel between $(x_1,y_1)$ and $(x_2,y_2)$. The drawing processor 32 then increments/decrements $y_1$ and $y_2$ by one (in the case of Y-major order) and repeats. These steps are carried out for the lines 41, 42 and 43 of the triangle 40 until the endpoint vertex $(x_{te},y_{te})$ is reached.

(4) Texture Address Generation

Texture is usually treated as surface data which is "mapped" or "cast" onto an object surface. Illustratively, the drawing processor 32 first renders the object surface in 3-D space. The drawing processor 32 then maps an equivalent surface area of texture data onto the rendered object surface. Thus, if the object surface was a triangle, the texture data surface to be mapped onto the object surface is an equivalent triangle.

Like object surface coordinates, texture surface coordinates are expressed as two-dimensional coordinates (although, the convention is to refer to texture surface coordinates using u and v to distinguish from object surface coordinates.) The generation of addresses for texture data is similar to that for object surfaces discussed for (1) line drawing, (2) bitblt and (3) triangle drawing discussed above.

(5) Image Rotation/Mirror Image

A common operation performed by the drawing processor 32 is the 2-D rotation of an object. A simple case of such a rotation is the mirror operation which is illustrated in FIG. 5. As shown, an object 51 is initially displayed on the display screen. The object is then replaced by its mirror image with respect to the 45° axis for x=y. (It should be noted that an object can always be translated in virtual 2-D space to place its center point on the axis x=y. The object can be replaced by its mirror image and then translated back to its starting point in virtual 2-D space.) Such a simple operation typically requires a large amount of processing resources of the drawing processor 32.

(6) Object Scaling/Shearing

Object scaling/shearing is the process of distorting a 2-D object image. This is illustrated in FIG. 6. Consider the rectangle 80. The rectangle 80 has corners $(x_{p1},y_{p1})$, $(x_{p2},y_{p2})$, $(x_{p3},y_{p3})$ and $(x_{p4},y_{p4})$. The rectangle 80 also has a width SW and a height SH. In a scaling operation, the rectangle 80 may be transformed into the rectangle 81 having corners $(x'_{p1},y'_{p1})$, $(x'_{p2},y'_{p2})$, $(x'_{p3},y'_{p3})$ and $(x'_{p4},y'_{p4})$, width DW and height DH. Scaling can be achieved by modifying the bitblt operation discussed above. In an ordinary bitblt, a single source point of the source rectangle is moved to a single destination point in the destination rectangle. The pixels in the source rectangle are therefore all moved, either row-by-row or column by column. In contrast, in a scaling operation, SW/DW by SH/DH pixels in the source rectangle are moved to a single point in the destination rectangle. Therefore, every $(SW/DW)^{th}$ pixel must be moved from the source rectangle to the destination rectangle. Furthermore, every $(SH/DH)^{th}$ row of pixels in the source rectangle is moved to a respective row in the destination rectangle. This means that either rows or columns of pixels are skipped or outputted multiple times. For instance, assume that SW/DW=0.5 and SH/DH=2. In this case, only every other row of source pixels is outputted to a respective row of the destination rectangle. Furthermore, each pixel of each outputted row is moved to two adjacent pixel locations in a respective row of the destination rectangle.

Consider now the shearing operation, wherein the rectangle 80 is transformed into the parallelogram 82. In this case, the rectangle has been distorted by stretching the points $(x_{p1},y_{p1})$, $(x_{p2},y_{p2})$, $(x_{p3},y_{p3})$ and $(x_{p4},y_{p4})$ to $(x_{pa},y_{pa})$, $(x_{pb},y_{pb})$ $(x_{pc},y_{pc})$ and $(x_{pd},y_{pd})$. Another kind of modified bitblt, called a stretched bitblt can be used to perform the shearing operation. Consider that each horizontal row (vertical column) of pixels in the source rectangle is moved to a diagonal line (such as line 83) in the destination parallelogram. The reading out of pixels from the source rectangle is similar to that described above for scaling. However, the writing of pixels to the destination rectangle shares some features of line drawing. That is, it is necessary to edge walk along a starting line, e.g., the line 84, to find the starting point of the each diagonal, e.g., the diagonal 83. Then, it is necessary to move the pixels to fill locations of the diagonal line in a similar fashion to drawing the diagonal line.

Each of the above-noted processes is simple and important in the context of computer graphics. However, they impose a great burden on the drawing processor 32. This is disadvantageous for many applications such as flight simulation which require rendering 3-D objects to be rendered in real time, e.g., at 60 frames per second.

It is an object to overcome the disadvantages of the prior art. In particular, it is an object to speed up the processing of the above-noted processes and to reduce the processing load on the drawing processor.

SUMMARY OF THE INVENTION

These and another objects are achieved by the present invention. The present invention is intended to operate in a graphics controller that is attached to the bus of a computer system that also has a processor, main memory disk memory and input device attached thereto. The graphics controller is connected to a frame buffer in which pictures are stored for display on a display device, e.g., an LCD or CRT monitor. The graphics controller includes a drawing processor for drawing and rendering objects and performing other graphics related processing.

According to one embodiment, the pixels of each frame or field to be displayed on the display screen are assigned linear addresses in memory (e.g., the frame buffer or the shared memory). That is, the pixel with the lowest 2-D virtual coordinate is assigned a first memory address, the pixel with the next to lowest 2-D virtual coordinate is assigned the very next memory address and so on up to the pixel with the highest 2-D virtual coordinate. In the case of no interleaving, the pixels data are stored sequentially in the VRAMs of the frame buffer according to their linear addresses. In the case of interleaving, the pixel data are alternately stored in VRAM sets (in a round-robin fashion) according to their linear addresses.

To reduce the load on the drawing processor, an address generator is provided for converting the 2-D virtual coordinate of pixels on the screen to linear physical addresses in memory. The address generator has an edge walking circuit which receives a 2-D virtual coordinate of a first pixel on a first edge of an object displayed on the display screen. The edge walking circuit selectively outputs a 2-D virtual coordinate of a second pixel which intercepts the first edge of the object at an adjacent pixel row or column to the first pixel. The address generator also has a span expansion circuit which receives the 2-D virtual coordinate of the second pixel. The span expansion circuit selectively expands the 2-D virtual coordinate of the second pixel, according to the number of bits used to represent each pixel and the amount of information which can be accessed at a time from memory. This produces first and second expanded coordinates of the second pixel. Furthermore, the address generator has a linear address circuit which receives the first and second expanded coordinates of the second pixel. The linear address circuit outputs a linear physical address of the second pixel in memory.

Illustratively, the edge walking circuit evaluates the following formulas:

$$x' = x \text{ or } x \pm \Delta x$$
$$y' = y \text{ or } y \pm \Delta y$$

where (x,y) is the first 2-D virtual coordinate, (x',y') is the second 2-D virtual coordinate, $\Delta x$ is a slope component for a first one of the virtual coordinates, and $\Delta y$ is a slope component for a second one of the virtual coordinates.

The span expansion circuit evaluates the following formulas:

$$x'' = m \cdot x' \pm f_u$$
$$y'' = m \cdot y' \pm f_v$$

where x" is an expanded first coordinate, y" is an expanded second coordinate, $f_u$, $f_v$ are values which depend on the amount of data which can be accessed at one time from memory, and m is a factor which depends on the number of bits used to represent each pixel.

The linear address circuit evaluates the following formula:

$$ladd = x'' + y'' \cdot Xres + bsad$$

where ladd is the linear address to be calculated,

Xres is the number of pixels on each row of the display screen, and bsad is a base address or first address in memory at which the pixel data of a frame or field is stored.

By selectively activating or deactivating the edge walking and span expansion, the address generator can assist the drawing processor to perform line drawing, bitblt and triangle drawing operations. For instance, for line drawing and triangle drawing edge walking is activated. For bitblt and triangle drawing, the span expansion is controlled to retrieve from the memory long sequences of data, e.g., 64 or 128 bit sequences. This facilitates transferring large amounts of pixel data or filling large numbers of pixels at one time. The factors $f_u$ and $f_v$ can also appropriate factors for correct offsets to texture data in memory or for performing edge walking which may be necessary to locate the end point of a span expansion operation.

The span expansion circuit illustratively includes a swapping circuit which can swap the X and Y coordinates. This facilitates high speed mirror image operations. It also permits changing between X-major ordered processing and Y-major ordered processing.

In short, an address generator is disclosed which is specifically adapted to speed up processing particular common drawing operations in a graphics controller.

DETAILED DESCRIPTION OF THE INVENTION

Figure 7:
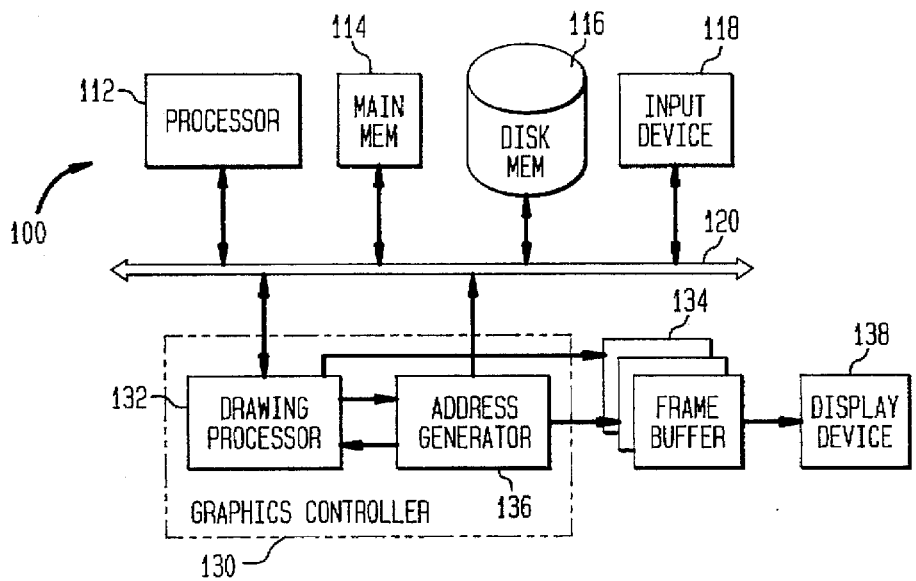
FIG. 7 shows a computer system according to an embodiment of the present invention.

FIG. 7 depicts a computer system 100 according to an embodiment of the present invention. As before, the computer system 100 has a processor 112, a main memory 114, a disk memory 116 and an input device 118. Each of these devices is connected to a bus 120. Also connected to the bus 120 is a graphics controller 130. The graphics controller 130 includes a drawing processor 132 and an address generator 136. The drawing processor 132 can output data to the frame buffer 134 while the address generator 136 can output address and chip select information to the frame buffer 134 (e.g., RAS, CAS and chip select). The pixel data stored in the frame buffer 134 is displayed on the display screen of the display device 138.

The drawing processor 132 can output 2-D virtual pixel coordinates on the display screen to the address generator 136. The drawing processor 132 can also output control signals and a variety of other parameters (described in greater detail below) to the address generator 136. In response, the address generator 136 outputs to the drawing processor 132 the linear addresses of the pixel coordinates in physical memory, e.g., the main memory 114 or the frame buffer 134. The drawing processor 132 can then use the linear addresses to access the pixel data in the main memory 114. Alternatively, the address generator 136 outputs the physical addresses directly to the main memory 114 (via the system bus 120) or to the frame buffer 134.

Figure 8:
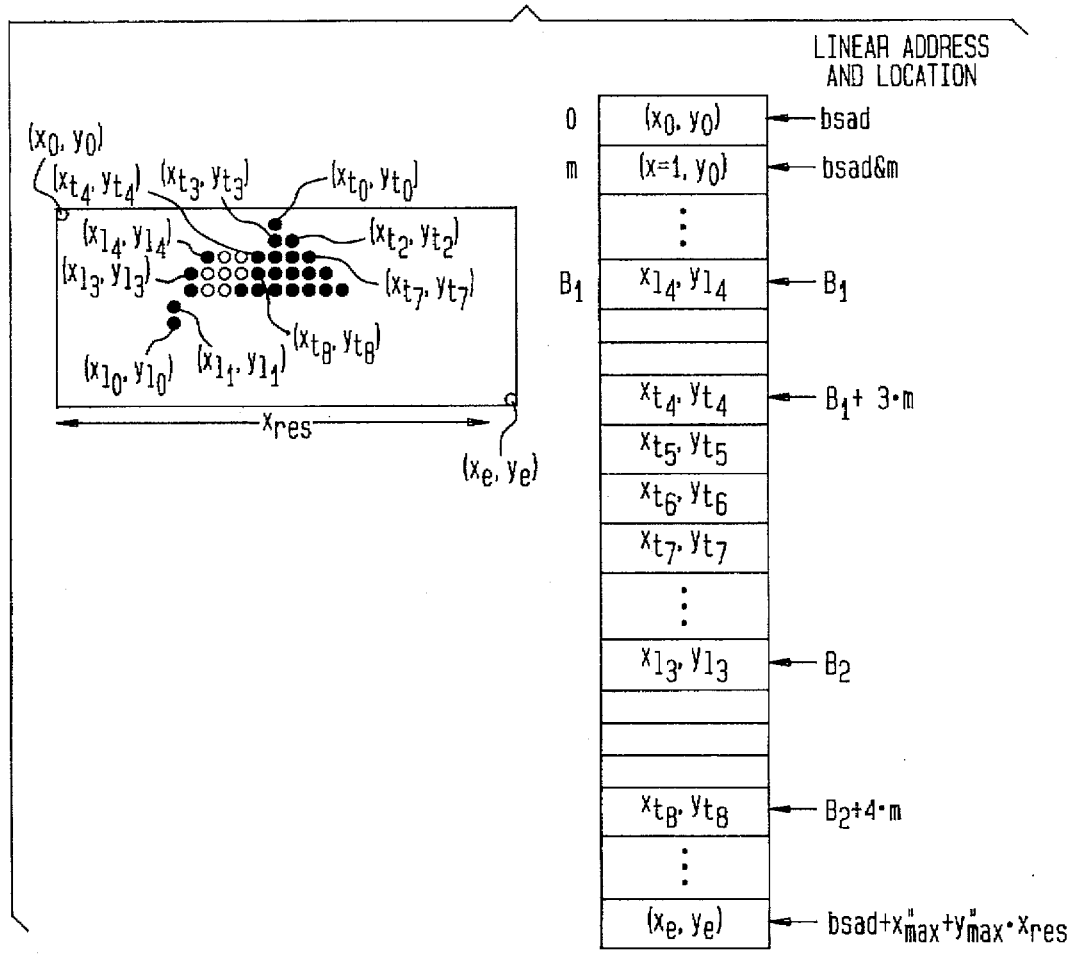
FIG. 8 illustrates the linear storage of pixel data in the frame buffer of the computer system of FIG. 7.

Prior to discussing the construction and operation of the address generator 136 it is advantageous to review the differences between the 2-D virtual address schema used on the display screen and the linear address schema used in physical memory. FIG. 8 illustrates this in greater detail. As shown, two objects are displayed on the display screen of the display device 138, namely, a line and a triangle. The line is made up of plural pixels which are identified with two coordinates as addresses. Starting from an initial point, and ending at an end point, on the line, these coordinates are as follows: $(x_{l0}, y_{l0}), (x_{l1}, y_{l1}), \ldots, (x_{l4}, y_{l4})$. Likewise, the 2-D virtual coordinates of the triangle are shown in row major order as $(x_{t0}, y_{t0}), (x_{t1}, y_{t1}), \ldots$. For purposes of illustration, assume that point $(x_{l4}, y_{l4})$ is on the same row of the display screen as $(x_{t4}, y_{t4})$ and is separated therefrom by two blank pixels. Likewise, assume that point $(x_{l3}, y_{l3})$ is on the same row as point $(x_{t8}, y_{t8})$ and is separated therefrom by three blank pixels.

According to the invention, the pixel data of each pixel having 2-D virtual coordinates on the display screen is assigned a linear addresses in memory (e.g., frame buffer 134 or main memory 114). This provides a tremendous savings in space which might otherwise be wasted. The conservation of wasted space can be as high as 50%. See U.S. Pat. Nos. 5,321,425, 5,268,682, and 5,268,681. The mapping between 2-D virtual address space and linear physical address space is as follows. Each pixel is represented by a certain number of bits such as 1, 2, 3 or 4 bytes. Starting at a base address ("bsad"), the pixel data of the pixel with the lowest coordinates, namely, (x=0,y=0) is assigned the linear address bsad. Assume that the mapping of pixels is in X-major order. The pixel with the next lowest pixel coordinates (x=1,y=0) is assigned the very next memory address. Suppose each memory address indexes a byte of data. Furthermore, suppose that m is the number of bytes used to represent the pixel data of each pixel. If so, then the linear address of the very next pixel in physical memory is bsad+m·x or bsad+m. Generally speaking, the linear address ("ladd") in physical memory of an arbitrary pixel at coordinates (x,y) is given by:

$$ladd = m \cdot x + y \cdot Xres + Bsad$$

where "Xres" is the number of bytes utilized by a whole row of pixels on the display screen.

In the case of no interleaving, each pixel is stored in the VRAM at consecutive memory locations according to the linear addresses. This is illustrated in FIG. 8. The pixel with 2-D virtual coordinates (x=0,y=0) (is assigned memory address Bsad and) is stored at the first available memory location (shown as location 0). The pixel with 2-D virtual coordinates (x=1,y=0) (is assigned memory address Bsad+m and) is stored at the very next available memory location (shown as location m). The data of the pixel with 2-D virtual coordinates $(x_{l4}, y_{l4})$ is assigned a linear address which is 3·m addresses away from the linear address assigned to the data of the pixel with 2-D virtual coordinates $(x_{t4}, y_{t4})$. If the data of the pixel with 2-D virtual coordinates $(x_{t4}, y_{t4})$ is stored at location $B_1$ in the VRAMs of the frame buffer, then the data of the pixel with 2-D virtual coordinates $(x_{l4}, y_{l4})$ is stored at location $B_1+3 \cdot m$. Likewise, the data of the pixel with 2-D virtual coordinates $(x_{t8}, y_{t8})$ is assigned a linear address which is 4·m memory locations away from the data of the pixel with 2-D virtual coordinates $(x_{l3}, y_{l3})$. If the data of the pixel with 2-D virtual coordinates $(x_{l3}, y_{l3})$ is stored at location $B_2$ in the VRAMs of the frame buffer 138, then the data of the pixel with 2-D virtual coordinates $(x_{t8}, y_{t8})$ is stored at location $B_2+4 \cdot m$.

Figure 9:
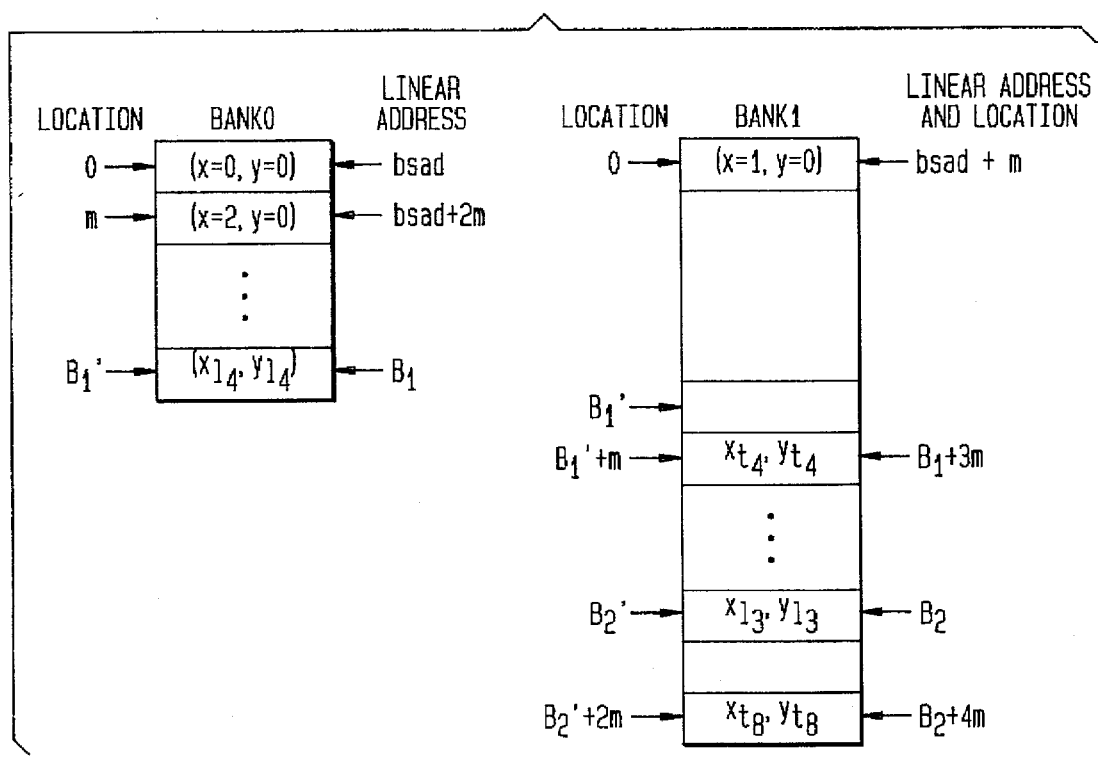
FIG. 9 illustrates the linear storage of pixel data in the frame buffer in an interleaved memory storage organization.

FIG. 9 shows a slightly different frame buffer organization. Here, the VRAMs which comprise the frame buffer 138 are divided into two banks, namely, bank 0 and bank 1. Each bank is activated by the address generator for reading or writing by transmitting an appropriate chip select signal to the VRAMs of the appropriate bank. As shown, the pixel data are alternately stored in bank 0 and bank 1. Thus, pixel data (x=0,y=0) is stored at address bsad which is the first memory location in bank 0 (shown as location 0). The pixel data of pixel (x=1,y=0) is stored at address bsad+m which is the first memory location in bank 1 (shown as location 0). The pixel data of pixel (x=2,y=0) is stored at address bsad+2·m which is the second memory location in bank 0 immediately following the pixel data for the pixel with the 2-D virtual address (x=0,y=0) (shown as location m), and so on. (In the case that m=1 byte, it is possible to input all of the most significant bits of the linear address, except the least significant bit, to the address input. The least significant bit may be outputted to the chip select of bank 0 and the complement of the least significant bit may be outputted to the chip select of bank 1. This causes all pixel data with even linear addresses to be stored sequentially in bank 0 and all pixel data with odd linear addresses to be stored sequentially in bank 1.) As shown, the data of the pixel with 2-D virtual address $(x_{l4}, y_{l4})$ is stored at a location $B_1$, in bank 0. The pixel $(x_{t4}, y_{t4})$ is stored at a location immediately following location $B_1$, in bank 1, namely, $B_1+m$. Likewise, the data of the pixel with 2-D virtual address $(x_{l3}, y_{l3})$ is stored at location $B_2$, (which equals $B_2/2$) in bank 1. The data of the pixel with 2-D virtual address $(x_{t8}, y_{t8})$ is stored in bank 1 at a location that is 2·m memory locations away from the location $B_2$.

Consider now that the drawing processor 132 must perform both edge walking and span expansion for pixels which are stored in the physical memory according to linear addresses. Ordinarily, this would impose a great burden on the drawing processor 132. The address generator 136 selectively performs both functions in conjunction with linear address conversion. In fact, the address generator 136 can perform such calculations dynamically, i.e., in real time. This reduces the processing load on the drawing processor 132 and generally speeds up the display of pictures (frames and fields) on the display device 138.

Figure 10:
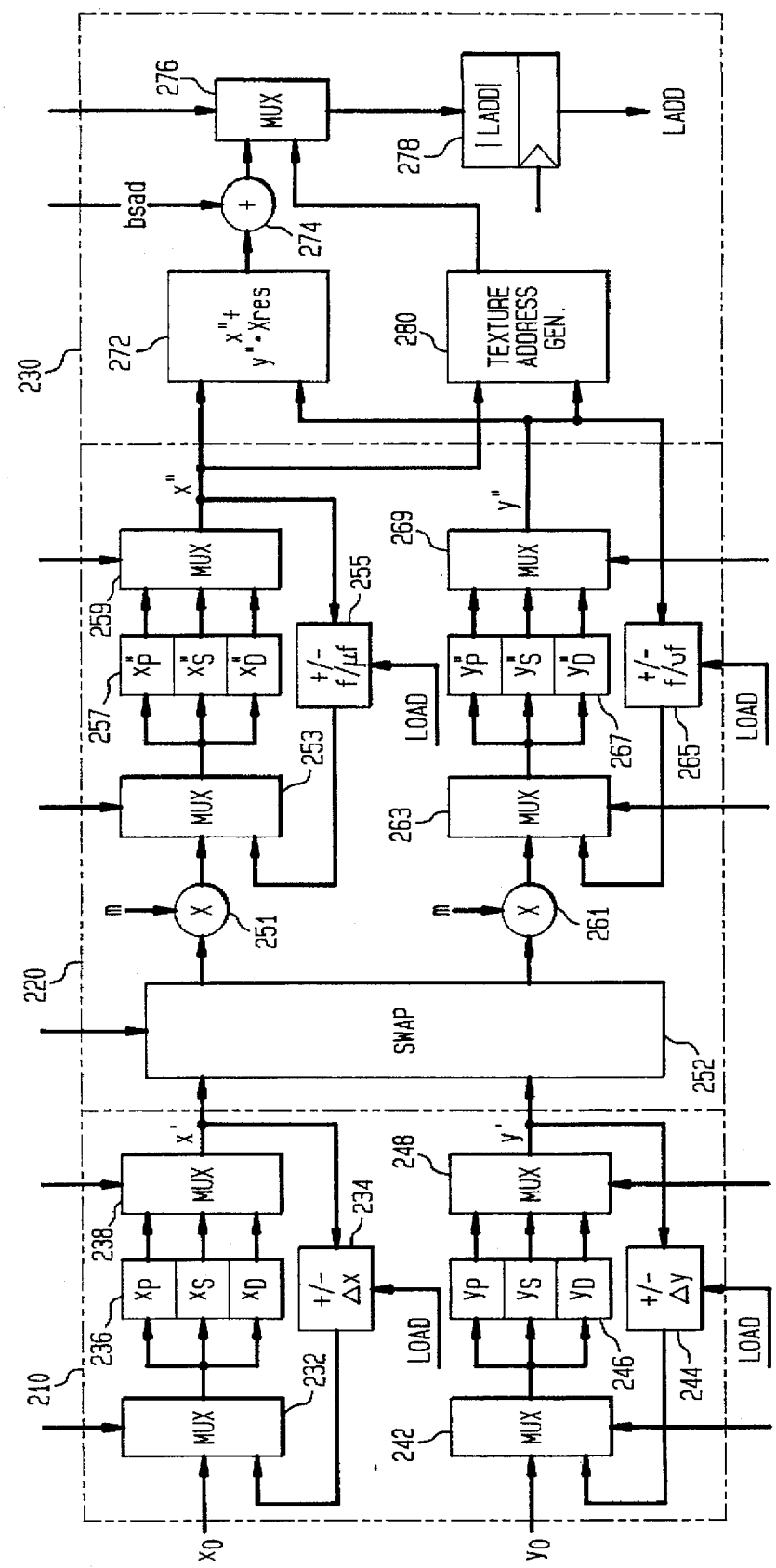
FIG. 10 illustrates an address generator according to an embodiment of the present invention.

FIG. 10 shows the address generator 136 in greater detail. As shown, the address generator includes three pipelined stages, namely, an edge walking stage 210, a span expansion stage 220 and a linear address stage 230. A 2-D virtual coordinate (x,y) is received at the edge walking circuit 210. The edge walking circuit selectively outputs a 2-D virtual coordinate (x'=x or x±$\Delta$x, y'=y or y±$\Delta$y) of a pixel on an adjacent row of the display screen (in X-major order line drawing), or an adjacent column of the display screen (in Y-major order line drawing), to the inputted pixel with 2-D virtual coordinate (x,y). The span expansion circuit 220 receives the 2-D virtual coordinate (x',y') and expands the virtual coordinate. That is, the span expansion circuit 220 attempts to retrieve plural pixels in the same row of the display screen (in Y-major order) or same column of the display screen (in X-major order). There are two considerations in determining the expanded virtual coordinate in span expansion space. The span expansion circuit 220 must account for the number of bits used to represent each pixel. The span expansion circuit 220 must also account for the number of bytes for which an access request can be issued to the frame buffer 138 in a single cycle. According to these considerations, the span expansion circuit outputs an expanded 2-D virtual coordinate (x",y"). The linear address circuit 230 converts the expanded 2-D virtual coordinate (x",y") to a linear address ladd.

The embodiment shown in FIG. 10 is for a non-interleaved frame buffer organization. No circuitry or processing is shown for determining the bank and memory location of a specific interleaved frame buffer organization. However, such additional processing of the linear address is well within the skill in the art. See, e.g., U.S. Pat. Nos. 5,321,425, 5,268,682 and 5,268,681.

Referring now to FIG. 10, the x coordinate is received at a multiplexer 232. The multiplexer 232 also receives the sum x±$\Delta$x outputted from the adder 234 (which is discussed in greater detail below). In response to a control signal generated by the drawing processor 132 (FIG. 7), the multiplexer 232 selects either the inputted coordinate x or the sum x±$\Delta$x. The value selected by the multiplexer 232 is outputted in parallel to plural registers 236. As shown, one register may be provided for storing a source $x_S$ coordinate, a destination $X_D$ coordinate and a pattern $x_P$ coordinate which are described in greater detail below. Illustratively, the drawing processor 132 (FIG. 7) outputs a control signal which activates only one of the registers 236 to store the value outputted by the multiplexer 232 at one time. The registers 236 output the values stored therein in parallel to a multiplexer 238. The multiplexer 238 also receives a control signal from the drawing processor 132 (FIG. 7). In response to the control signal, the multiplexer 238 selects one of the values outputted by the registers 236. The value selected by the multiplexer 238 is outputted to the span expansion circuit 220 as x'.

The selected value x' is also fed back to an adder circuit 234. The adder circuit 234 adds the received selected value to a slope component $\Delta$x. The slope component $\Delta$x may be written in the circuit 234 by the drawing processor 132 (FIG. 7).

Similar to the circuitry 232–238, the edge walking circuit 210 also has circuitry 242–248. The y coordinate is received at a multiplexer 242. The multiplexer 242 also receives the sum y±$\Delta$y outputted from the adder 244 (which is discussed in greater detail below). In response to a control signal generated by the drawing processor 132 (FIG. 7), the multiplexer 242 selects either the inputted coordinate y or the sum y±$\Delta$y. The value selected by the multiplexer 242 is outputted in parallel to plural registers 246. As shown, one register may be provided for storing a source $y_S$ coordinate, a destination $y_D$ coordinate and a pattern $y_P$ coordinate which are described in greater detail below. Illustratively, the drawing processor 132 (FIG. 7) outputs a control signal which activates only one of the registers 246 to store the value outputted by the multiplexer 242 at one time. The registers 246 output the values stored therein in parallel to a multiplexer 248. The multiplexer 248 also receives a control signal from the drawing processor 132 (FIG. 7). In response to the control signal, the multiplexer 248 selects one of the values outputted by the registers 246. The value selected by the multiplexer 248 is outputted to the span expansion circuit 220 as y'.

The selected value y' is also fed back to an adder circuit 244. The adder circuit 244 adds the received selected value to a slope component $\Delta$y. The slope component $\Delta$y may be written in the circuit 244 by the drawing processor 132 (FIG. 7).

Note that adders 234, 244 and multiplexers 232, 242 are optional and may be omitted. Instead, the inputted x,y 2-D virtual coordinate may be inputted directly to the registers 236, 246, respectively. Each adder 234, 244 may be provided with a register for storing the value selected by the multiplexers 232, 242, respectively, for addition with $\Delta$x and $\Delta$y, respectively. Note also, that $\Delta$x, or $\Delta$y or both may be either positive or negative fractions.

The edge walking circuit 210 evaluates the formulas:

$$x'=x \text{ or } x\pm\Delta x$$

$$y'=y \text{ or } y\pm\Delta y$$

where the choice of assignment of x' and y' is controllable by the drawing processor 132 (FIG. 7).

The 2-D virtual coordinate (x',y') outputted by the edge walking circuit 210 are received at a swapping circuit 252. The swapping circuit also receives a swapping control signal from the drawing processor 132 (FIG. 7). In response to the swapping control signal, the swapping circuit 252 either outputs the coordinates as received or swaps them. That is, the multiplier 251 receives the value x', if swapping is disabled by the swapping control signal, or the value y', if swapping is enabled by the swapping control signal. Likewise, the multiplier 261 receives the value y', if swapping is disabled by the swapping control signal, or the value x', if swapping is enabled by the swapping control signal.

For sake of convenience, the description continues assuming that the multiplier 251 receives the value x' and the multiplier 261 receives the value y'. The multiplier 251 also receives a factor m from the drawing processor 132 (FIG. 7). The factor m illustratively is selected depending on the number of bits used to represent each pixel. Preferably, byte units are used throughout the architecture, and m is selected to be an integer such as 1 (1 byte/pixel), 2 (2 bytes/pixel), 3 (3 bytes/pixel) or 4 (4 bytes/pixel). The multiplier 251 multiplies x' by m to produce the product m·x'. The product m·x' is inputted to the multiplexer 253. The multiplexer 253 also receives the sum m·x'±$f_u$ from an adder circuit 255 (which is discussed in greater detail below). Furthermore, the multiplexer 253 receives a control signal from the drawing processor 132 (FIG. 7). In response to the control signal, the drawing processor 132 (FIG. 7) causes the multiplexer 253 to select either the value m·x' or the value m·x'±$f_u$. The selected values are outputted in parallel to plural registers 257. Illustratively, one register is provided for storing the expanded source coordinate x"$_S$, one for storing the expanded destination coordinate x"$_D$ and one for storing the expanded pattern component x"$_P$. The purpose of these registers is described in greater detail below. Illustratively, the drawing processor 132 (FIG. 7) outputs an enable signal for enabling only one of the registers 257 to store the value outputted from the multiplexer 253.

The registers 257 output the values stored therein in parallel to the multiplexer 259. The multiplexer 259 also receives a control signal from the drawing processor 132 (FIG. 7). In response, the multiplexer 259 selects one the values outputted from the registers 257. The selected value outputted from the multiplexer serves as an outputted expanded coordinate x".

The selected value x" is fed back to the adder 255. The adder 255 also receives a factor $f_u$ from the drawing processor 132 (FIG. 7). Illustratively, the factor $f_u$ is selected based on the number of bits in the frame buffer 138 (FIG. 7) to be accessed via a single request. First, assume that there is no interleaving. Furthermore, assume that pixel data occupies only 8 bits and that a block access operation can access 64 bits in the VRAMs of the frame buffer 138 (FIG. 7). The factor $f_u$ is then set to 1 byte (8 bits) for a pixel-by-pixel access and 8 bytes (64 bits) for a block access. Consider that such values of $f_u$ cause the address to increment by one linear address and eight linear addresses, respectively. In the case of 2 bank interleaving, the linear address is incremented by 2 or 16. Thus, for two bank interleaving, the value $f_u$ may be doubled; i.e., 2 bytes (16 bits) for a pixel-by-pixel access and 16 bytes (128) bits for a block access. The adder adds the value x" to the factor $f_u$. This value is fed back to the multiplexer 253 as described above.

The span expansion circuit 220 may have circuits 261-269 that are similar to circuits 251-259. The multiplier 261 receives the value y' and a factor m from the drawing processor 132 (FIG. 7). The multiplier 261 multiplies y' by m to produce the product m·y'. The product m·y' is inputted to the multiplexer 263. The multiplexer 263 also receives the sum m·y'±$f_v$ from an adder circuit 265 (which is discussed in greater detail below). Furthermore, the multiplexer 263 receives a control signal from the drawing processor 132 (FIG. 7). In response to the control signal, the drawing processor 132 (FIG. 7) causes the multiplexer 263 to select either the value m·y' or the value m·y'±$f_v$. The selected values are outputted in parallel to plural registers 267. Illustratively, one register is provided for storing the expanded source coordinate y"$_S$, one for storing the expanded destination coordinate y"$_D$ and one for storing the expanded pattern coordinate y"$_P$. The purpose of these registers is described in greater detail below. Illustratively, the drawing processor 132 (FIG. 7) outputs an enable signal for enabling only one of the registers 267 to store the value outputted from the multiplexer 253.

The registers 267 output the values stored therein in parallel to the multiplexer 269. The multiplexer 269 also receives a control signal from the drawing processor 132 (FIG. 7). In response, the multiplexer 269 selects one the values outputted from the registers 267. The selected value outputted from the multiplexer 269 serves as an outputted expanded coordinate y".

The selected value y" is fed back to the adder 265. The adder 265 also receives a factor $f_v$ from the drawing processor 132 (FIG. 7). Illustratively, the factor $f_v$ may be selected using similar criteria as described above for $f_u$. The adder 265 adds the value y" to the factor $f_v$. This value is fed back to the multiplexer 263 as described above.

Note that the multiplexer 263 and adder 265 are not needed for X-major order span expansion. However, the multiplexer 263 and adder 265 provide for scaling as described below.

The span expansion circuit evaluates the following formulas:

$$x''=m \cdot x' \pm f_u$$

$$y''=m \cdot y' \pm f_v$$

The linear address circuit 230 receives the expanded coordinates x" and y" at a calculation circuit 272. The calculation circuit has an adder and a multiplier which calculates the following:

$$x''+y'' \cdot Xres$$

where Xres is the number of pixels on each row of the display screen of the display device 138. (The value Xres may be inputted from the drawing processor 132 (FIG. 7).) The calculated result x"+y"·Xres is outputted to an adder 274 which also receives a base address bsad from the drawing processor 132 (FIG. 7). The sum x"+y"·Xres+bsad is outputted to a multiplexer 276.

The linear address circuit also has a texture address circuit 280 which receives the coordinates x" and y". The texture address circuit 280 determines a linear address for accessing texture data stored in memory. The specific circuitry utilized within the texture address circuit 280 depends on the organization of the texture data in the memory. Since texture data storage organizations can vary, none is described herein. However, U.S. patent application Ser. No. 08/598,523, entitled, "Rip Map/Mip Map Textured Address Generator," describes one such textured data storage organization and circuit. Advantageously, the circuit described in this document is also used in conjunction with U.S. patent application Ser. No. 08/598,521, now U.S. Pat. No. 5,740,344, entitled, "Texture Filter Apparatus for Computer Graphics System" in order to produce interpolated texture values. Another texture data storage organization and process for access is disclosed in U.S. Pat. No. 5,222,205.

The texture data address is outputted from the texture address circuit 280 to the multiplexer 276. The multiplexer 276 also receives a control signal from the drawing processor 132 (FIG. 7). In response, the multiplexer selects one of the linear addresses inputted thereto for output. The selected linear address may be latched into register 278 and then outputted from there to either the drawing processor 132 (FIG. 7) or directly to the frame buffer 138 (FIG. 7).

The operation of the invention is now described with reference to performing specific tasks.

A. Line Drawing-Edge Walking

As noted above, an important aspect of line drawing is edge walking. Suppose that it is known ahead of time the start points ($x_s, y_s$) and end points ($x_e, y_e$) of the line. The drawing processor 132 (FIG. 7) can determine the slope of the line and can select either X-major ordered drawing or Y-major ordered drawing. Suppose that X-major ordered drawing is selected. Furthermore, suppose that each pixel is represented by m bytes.

The process by which drawing is performed is as follows:
(1) Set x and y to starting coordinates $x_s, y_s$
(2) Determine the linear address for $x_s, y_s$
(3) Fill all of the pixels on the row $y=y_s$ that also fall on the line to be drawn. This is achieved by keeping y fixed to $y_s$ and incrementing or decrementing x and calculating the linear address for x and y.
(4) Increase or decrease y, which ever is appropriate for bringing y closer to $y_e$. Repeat steps (3) and (4) until $y=y_e$.

These steps are now explained. To achieve steps (1)–(2), the drawing processor 132 enables the edge walking of the edge walking circuit 210 but disables span expansion of the span expansion circuit 220 (as described below). The drawing processor 132 (FIG. 7) loads an appropriate slope component $\Delta x$ into the adder 234 and an appropriate m is inputted to the multipliers 251 and 261. The drawing processor 132 (FIG. 7) initially loads the slope component $\Delta y=0$ into the adder 244. The drawing processor 132 (FIG. 7) also outputs the correct base address bsad to the adder 274 for accessing the appropriate frame in the frame buffer 138 (FIG. 7).

On the first cycle, the 2-D virtual coordinate of the starting point $x_s$ and $y_s$ are inputted to the edge walking circuit 210. The drawing processor 132 (FIG. 7) outputs a control signal to the multiplexers 232, 242 to select the inputted 2-D virtual coordinate of the starting point $x_s$ and $y_s$. The drawing processor 132 (FIG. 7) causes the coordinate $x_s$ to be stored in the register $x_D$ of the registers 236 and the coordinate $y_s$ to be stored in the register $y_D$ of the registers 246.

On the second cycle, the drawing processor 132 (FIG. 7) outputs a control signal to the multiplexers 238, 248 to select as x' and y' the coordinates stored in the registers $x_D$ and $y_D$, namely, $x_s$ and $y_s$. These values are inputted to the swapping circuit 252. The drawing processor 132 (FIG. 7) outputs a swapping control signal to disable swapping. Thus, the coordinate $x'=x_s$ is multiplied by m in the multiplier 251 and the coordinate $y'=y_s$ is multiplied by m in the multiplier 261. The product $m \cdot x_s$ is inputted to the multiplexer 253 and the product $m \cdot y_s$ is inputted to the multiplexer 263. The drawing processor 132 (FIG. 7) outputs a control signal to the multiplexers 253, 263 to select the products $m \cdot x_s$ and $m \cdot y_s$, respectively. (This is how the drawing processor 132 disables span expansion.) The drawing processor 132 (FIG. 7) also outputs an enable signal to cause the products $m \cdot x_s$ and $m \cdot y_s$ to be stored in the registers $x''_D$ and $y''_D$, respectively.

On the third cycle, the drawing processor 132 (FIG. 7) outputs a control signal to the multiplexers 259 and 269 causing them to select as x" and y" the products stored in the registers $x''_D$ and $y''_D$, namely, $m \cdot x_s$ and $m \cdot y_s$, respectively. These expanded coordinates $x''=m \cdot x_s$ and $y''=m \cdot y_s$ are inputted to the calculator circuit 272. The calculator circuit 272 performs the calculation $x''+y'' \cdot Xres$. The result of the calculation is outputted to the adder 274 where it is added to bsad to produce the linear address $ladd=bsad+x''+y'' \cdot Xres$. The drawing processor 132 (FIG. 7) outputs a control signal to the multiplexer 276 to select the linear address ladd outputted from the adder 274. The selected linear address ladd is then latched in register 278. On cycle four, the linear address ladd of the starting point $(x_s, y_s)$ is available for output.

To perform step (3), note that the coordinates x', y' outputted from the multiplexers 238, 248 are fed back to adders 234, 244. On cycle two, the coordinate $x'=x_s$ is added to $\Delta x$ in adder 234. The coordinate $y'=y_s$ is added to $\Delta y=0$ in adder 244. These sums $x' \pm \Delta x = x_s + \Delta x$ and $y' \pm \Delta y = y_s$ are fed back as inputs to the multiplexers 232 and 242. Therefore, on cycle two, the drawing processor 132 (FIG. 7) outputs a control signal which causes the multiplexers 232, 242 to select the outputted sums of these adders, namely, $x_s + \Delta x$ and $y_s$. Note that on cycle three, the adders 234, 244 output the coordinates $x_s + 2 \cdot \Delta x$ and $y_s$, respectively. Thus, the coordinates $x_s + 2 \cdot \Delta x$, $y_s$ are selected for input on the cycle three. In general, so long as $\Delta y$ is kept at 0, the value of x is incremented or decremented by the slope component $\Delta x$ each cycle and y is held constant at $y_s$. This causes the edge walking circuit 220 to sequentially output the coordinates of each pixel on the row of the display screen $y=y_s$ that also fall on the line to be drawn. Such coordinates are inputted to the span expansion circuit 220 and linear address circuit 230 to determine the linear address of the coordinates of such pixels.

To achieve step (4), the drawing processor 132 (FIG. 7) outputs, at the appropriate time, a slope component $\Delta y$ of $+1$ or $-1$ to the adder 244. This causes the value of y to increment or decrement from $y_s$. (The $\Delta y$ of $+1$ is used where $y_s < y_e$ and the $\Delta y$ of $-1$ is used where $y_s > y_e$.) The drawing processor 132 (FIG. 7) only outputs such a slope component $\Delta y$ for a single cycle. Once the value of y is incremented or decremented, the drawing processor 132 (FIG. 7) resets $\Delta y$ to 0. This keeps the row of the display screen fixed while determining the linear addresses of the pixels on that frame row to be filled.

Note that the architecture of the linear address circuit 230, most notably, the calculator 272, presumes that the linear addresses are assigned in X-major order. In the case that Y-major ordering is used, the drawing processor 132 (FIG. 7) may output a swapping control signal to the swapping circuit 252 for activating swapping. The reverses the roles of x" and y" in the calculator circuit 272. Furthermore, the drawing processor 132 (FIG. 7) outputs Yres, in place of Xres, where Yres is the number of pixels in a column of the display screen. As such, the calculator circuit 272 calculates $y''+x'' \cdot Yres$.

Note also that $\Delta x$ and $\Delta y$ need not be integers. Thus, x' and y' might not be integers. Illustratively, the multipliers 251 and 261 convert x' and y' to integer form before performing the multiplication.

B. Bitblt

To perform the bitblt, the drawing processor 132 (FIG. 7) disables the edge walking feature of the edge walking circuit 210 and enables the span expansion feature of the span expansion circuit 220. Stated simply, a source rectangle of pixel data (in 2-D virtual coordinate space) is to be moved to a destination rectangle. In this example, the following notation is used: $(x_{ss}, y_{ss})$ is the source rectangle starting 2-D virtual coordinate and $(x_{se}, y_{se})$ is the source rectangle end 2-D virtual coordinate. The steps carried out in performing the bitblt are as follows:

(1) Input the initial source 2-D virtual coordinate $(x_{ss}, y_{ss})$
(2) While keeping y fixed, and starting from the column $x_{ss}$ of the source rectangle, determine the linear address of each block transfer to be performed on the row of the display screen y,
(3) If necessary, determine the linear address of any pixel-by-pixel transfers needed to reach the edge $(x_{se}, y)$ of the source rectangle to be moved,
(4) Increment y and repeat steps (2)–(4) until y equals $y_{se}$.

Figure 1:
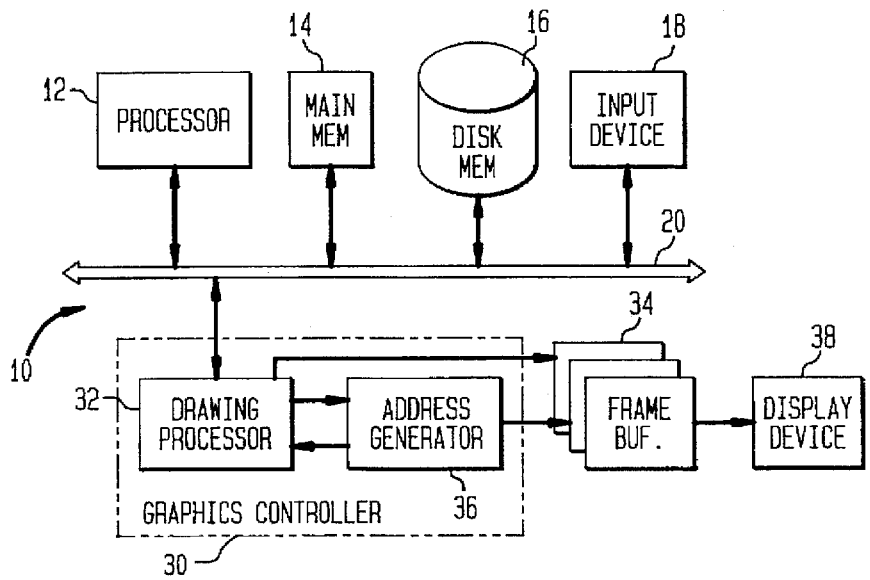
FIG. 1 shows a conventional computer system.
Figure 2:
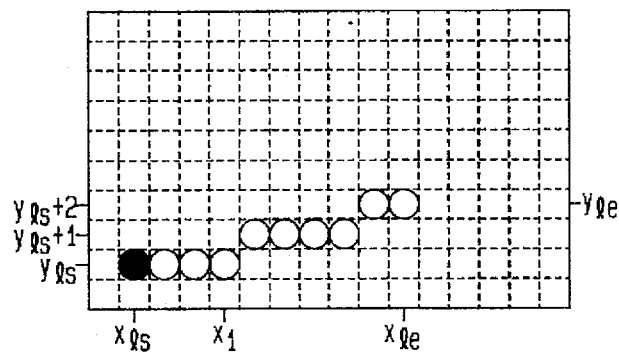
FIG. 2 illustrates a line drawing operation.
Figure 3:
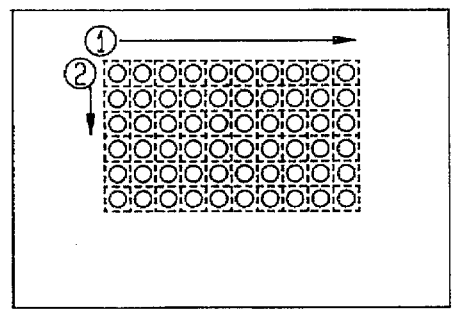
FIG. 3 illustrates a bitblt operation.
Figure 4:
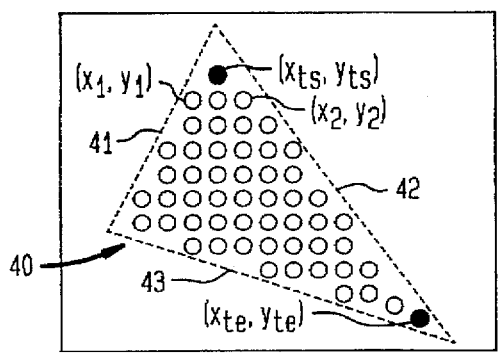
FIG. 4 illustrates a triangle drawing operation.
Figure 5:
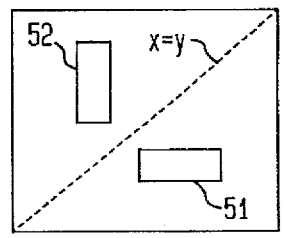
FIG. 5 illustrates a mirror operation.

To achieve step (1), the drawing processor 132 (FIG. 7) outputs m to the multipliers 251 and 261, Xres to the calculator circuit 272 and bsad 274 to the adder 274. The drawing processor 132 (FIG. 7) also outputs a slope component Δy to the adder 244 and the factor $f_y$=0 to the adder 265. On cycle one, the drawing processor 132 (FIG. 2) inputs the source starting 2-D virtual coordinate ($x_{ss},y_{ss}$) to the edge walking circuit 210. The drawing processor 132 (FIG. 7) outputs a control signal to the multiplexers 232 and 242 for selecting the inputted 2-D virtual coordinate ($x_{ss}, y_{ss}$). The drawing processor 132 (FIG. 7) also enables the registers $x_s$ and $y_s$ to store the value outputted from the multiplexers 232, 242.

To achieve step (2), the drawing processor 132 (FIG. 7) outputs control signals to the multiplexers 238,248 for selecting the coordinates stored in the registers $x_s$ and $y_s$, namely, $x_{ss}$ and $y_{ss}$. These values are outputted as x' and y' to the swapper circuit 252. Illustratively, the drawing processor 132 (FIG. 7) outputs a swapper control signal for disabling swapping. The coordinates x'=$x_{ss}$ and y'=$y_{ss}$ are multiplied with m in multipliers 251 and 261. The drawing processor 132 (FIG. 7) outputs a control signal to the multiplexers 253 and 263 for selecting the products m·x'= m·$x_{ss}$ and m·y'=m·$y_{ss}$. The drawing processor 132 (FIG. 7) also outputs an enable control signal for storing the values selected by the multiplexers 253 and 263 in the registers x"$_s$ and y"$_s$.

The drawing processor 132 (FIG. 7) determines how many block transfers to perform without overshooting (accessing pixel data in the row of the display screen $y_{ss}$ beyond the far edge column of the source rectangle $x_{se}$). Assume that at least one block transfer is to be performed which transfers 64 bits. The drawing processor 132 (FIG. 7) thus loads $f_u$=8 into the adder 255.

On cycle three, the drawing processor 132 (FIG. 7) outputs a control signal to the multiplexers 259, 269 to select the values stored in the registers x"$_s$ and y"$_s$, namely, m·$x_{ss}$ and m·$y_{ss}$. The values are outputted to the calculator 272 which produces the result m·$x_{ss}$+m·y"$_{ss}$·Xres. The result is added to bsad in the adder 274 to produce the linear address ladd=bsad+m·$x_{ss}$+m·y"$_{ss}$·Xres. The drawing processor 132 (FIG. 7) outputs a control signal to the multiplexer 276 to select the linear address ladd. The linear address ladd selected by the multiplexer 276 is latched in the register 278. On cycle four, the linear address is issued to the VRAMs of the frame buffer 134 (FIG. 7) in the form of a block transfer command. This causes 64 sequential bits, starting from the address ladd to be transferred.

Meanwhile, on cycle three, the value x"=m·$x_{ss}$ is fed back to the adder 255. Therein, the factor $f_u$ is added to x" to produce m·$x_{ss}$+$f_u$. This sum is fed back to the multiplexer 253. Likewise, the value y" is added to $f_y$ in the adder 265 to produce m·$y_{ss}$+$f_y$. However, $f_y$=0. Therefore, m·$y_{ss}$ is fed back to the multiplexer 263. The drawing processor 132 (FIG. 7) now outputs a control signal to the multiplexers 253 and 263 to select the values outputted from the adders 255 and 265. The drawing processor 132 (FIG. 7) also outputs enable signals to cause the values selected by the multiplexers 253, 263 to be stored in the registers x"$_s$ and y"$_s$.

On cycle four, the drawing processor 132 (FIG. 7) outputs control signals to the multiplexers 259 and 269 for selecting the values stored in the registers x"$_s$ and y"$_s$, namely, x"=m·$x_{ss}$+$f_u$ and y"=m·$y_{ss}$. These values are outputted to the linear address circuit 230 which produces a linear address therefrom.

Note that x" has been increased by $f_u$ or the number of bits transferred during the block transfer using the starting coordinates $x_{ss},y_{ss}$. Therefore, the linear address calculated using x" on cycle five will cause pixel data to be transferred from the address immediately following the last address of pixel data accessed in the previous block transfer.

Consider now the process step (3). Assume that the drawing processor 132 (FIG. 7) must disable the block transfer (for the linear address calculated using x"=m·$x_{ss}$+$f_u$ and y"=m·$y_{ss}$) to prevent overshooting the far edge of the source rectangle. Instead, the drawing processor 132 (FIG. 7) must perform, pixel by pixel transfers. At the appropriate time, the drawing processor 132 (FIG. 7) loads the adder 255 with a new factor $f_{u'}$ which reflects the smaller number of bits to be transferred by a non-block transfer. For example, with no interleaving and byte sized transfers per pixel, $f_{u'}$=1 byte. On cycle four, the adder adds $f_{u'}$ to x"=m·$x_{ss}$+$f_u$ to produce m·$x_{ss}$+$f_u$+$f_{u'}$. Therefore, on cycle four, the multiplexer 253 selects the value m·$x_{ss}$+$f_u$+$f_{u'}$ to be stored in the register x"$_s$. (As before, the adder 265 outputs m·$y_{ss}$, which is selected by the multiplexer 263 and stored in the register y"$_s$.) These values are outputted to the linear address circuit 230 on cycle five to determine the next linear address.

Consider now process step (4). In the edge walking circuit 210, the drawing processor 132 (FIG. 7) up until step four has loaded Δx=0 and Δy=0 into the adders 234 and 244 (so as to disable edge walking). Furthermore, the drawing processor 132 (FIG. 7) has outputted a control signal to the multiplexers 232 and 242 to select the output of the adders 234 and 244 for input to the registers 236 and 246. Therefore, the coordinates $x_{ss}$ and $y_{ss}$ stored in the registers $x_S$ and $y_S$ have not changed. At the appropriate time, the drawing processor 132 (FIG. 7) loads the slope component Δy=1 into the adder 244. This causes the value $y_{ss}$+Δy=$y_{ss}$+1 to be inputted to the multiplexer 242. The multiplexer 242 selects this value $y_{ss}$+1 and stores the value in the register $y_S$. The values stored in the registers $x_S$ and $y_S$, namely, the coordinates $x_{ss}$ and $y_{ss}$+1, are outputted through the swapper circuit 252 to the multipliers 251 and 261. The products m·$x_{ss}$ and m·($y_{ss}$+1) are outputted from the multipliers 251, 261 to the multiplexers 253 and 263. At the appropriate time, the drawing processor 132 (FIG. 7) outputs control signals to the multiplexers 253, 263 to select the products outputted form the multipliers 251, 261. These products m·$x_{ss}$ and m·($y_{ss}$+1) are then stored in the registers x"$_S$ and y"$_S$.

Note that on the very next cycle, the span expansion circuit 220 outputs the expanded coordinates x"=m·$x_{ss}$ and y"=m·($y_{ss}$+1). These are the coordinates of the pixel on the very next row of the source rectangle at the starting edge (starting column $x_{ss}$).

Now consider the steps involved in writing the pixel data of the source rectangle to a destination rectangle, e.g., in the same frame. Advantageously, this is achieved row by row. The start coordinates of the source rectangle ($x_{ss},y_{ss}$) are stored in the registers $x_S$ and $y_S$, respectively. Likewise, the start coordinates of the destination rectangle ($x_{ds},y_{ds}$) are stored in the registers $x_D$ and $y_D$, respectively. The above processing is performed to read-out one source rectangle row of pixel data. The read-out pixel data is stored, for example, in the main memory 114 (FIG. 7). Prior to reading-out the next source rectangle row, the drawing processor 132 (FIG. 7) outputs a control signal to the multiplexers 238,248 to select the coordinates stored in the registers $x_D$ and $y_D$, namely, the destination starting coordinates ($x_{ds},y_{ds}$). These coordinates ($x_{ds},y_{ds}$) are multiplied by m and stored in the registers x"$_D$ and y"$_D$. The drawing processor 132 (FIG. 7) then carries out similar block and pixel-by-pixel transfer address calculation as was done to read out the source rectangle row of pixel data. However, this time, the previously read-out data is written back to the linear addresses corresponding to the first row of the destination block. Once this is completed, the drawing processor 132 (FIG. 7) reverts to processing the source rectangle, i.e., reading-out the next row of data in the source rectangle. The drawing processor 132 (FIG. 7) thus alternates between reading out a row of data from a source rectangle and writing that row in the destination rectangle.

Note also that non-interleaved addresses were considered above. In the case, that interleaving is used over p banks, then, for 64 bit block transfers, m is set to 64·p. For pixel-by-pixel transfers, where a byte is transferred for each pixel, m is set to p·8.

C. Triangle Drawing

The process of triangle drawing is merely a combination of the edge-walking process utilized in line drawing and the span expansion process used in the bitblt operation. The steps for performing triangle drawing are:

(1) beginning with the starting vertex coordinates at the meeting of first and second edges, determine the linear address of the starting vertex, (2) edge walk on first triangle edge to the ending coordinate on the current row (column); if the end vertex of the first triangle edge is reached, then perform edge walking on third edge from the end vertex of the first triangle edge, (3) edge walk from the vertex along the second triangle edge to the starting column on the current row (column); if the ending vertex on the second edge is reached, perform edge walking on the third triangle edge at the end vertex of the second triangle edge, (4) span expansion on the current row (column) from the starting coordinate on the second triangle edge to reach the end coordinate on the first triangle edge, (5) repeat steps (2)–(5) until ending vertex of third edge is reached in either steps (2) or (3).

To achieve these steps, the address generator 136 has to perform edge walking on two edges simultaneously, namely, the near edge of the triangle from which span expansion begins, and the far edge of the triangle, at which span expansion ends. The "near edge" point and "far edge" point, are outputted to the drawing processor 132 which can easily determine how to control the span expansion circuit to perform the requisite span expansion (i.e., how many block and pixel-by-pixel transfers to perform). Illustratively, the edge walking on the near edge is performed in the edge walking circuit 210 and the edge walking on the far edge is performed in the span expansion circuit 220 as described below.

Illustratively, to perform step (1), the drawing processor 132 (FIG. 7) determines the vertex coordinates $(x_{p1},y_{p1})$, $(x_{p2},y_{p2})$ and $(x_{p3},y_{p3})$ of the three triangle edges. Suppose the vertices of the first triangle edge are $(x_{p1},y_{p1})$ and $(x_{p2},y_{p2})$, the vertices of the second triangle edge are $(x_{p1},y_{p1})$ and $(x_{p3},y_{p3})$ and the vertices of the third triangle edge are $(x_{p3},y_{p3})$ and $(x_{p2},y_{p2})$. Based on the coordinates $(x_{p1},y_{p1})$, $(x_{p2},y_{p2})$ and $(x_{p3},y_{p3})$, the drawing processor 132 (FIG. 7) determines whether or not to use Y-major order (row-by-row) drawing or X-major order drawing (column-by-column). For sake of discussion Y-major order is presumed to be selected.

To perform step (2), the following substeps (a)–(d) are performed:

(a) On cycle one, the drawing processor 132 inputs the starting vertex coordinates $(x_{p1},y_{p1})$ to the multiplexers 232, 242 of the edge walking circuit 210. The drawing processor 132 outputs control signals to the multiplexers 232, 242 and the registers 236, 246 to cause the starting vertex coordinates $(x_{p1},y_{p1})$ to be stored in the registers $x_S$, $y_S$.

(b) On cycle two, the drawing processor 132 outputs control signals to the multiplexers 238, 248 for causing the register values $x_S=x_{p1}$ and $y_S=y_{p1}$ to be outputted to the span expansion circuit 220. The drawing processor 132 outputs a control signal to the swapper circuit 252 for disabling swapping. Furthermore, the drawing processor 132 outputs the appropriate value of m (depending on the number of bytes used for storing each pixel, i.e., 1, 2, 3, . . . ) to the multipliers 251 and 261. Thus, the multiplexers 253, 263 receive the values $m \cdot x_{p1}$ and $m \cdot y_{p1}$, respectively. The drawing processor 132 outputs control signals to the multiplexers 253, 263 and registers 257 and 267 for storing the values $m \cdot x_{p1}$ and $m \cdot y_{p1}$ in the registers $x''_S$ and $y''_S$, respectively.

(c) On cycle three, the drawing processor 132 outputs the values $f_u=m \cdot (x_{p2}-x_{p1})/(y_{p2}-y_{p1})$ and $f_v=m \cdot 1 \cdot \text{sign}(y_{p2}-y_{p1})$ to the adders 255 and 265. Furthermore, the drawing processor 132 outputs control signals to the multiplexers 259 and 269 for selecting the values $m \cdot x_{p1}$ and $m \cdot y_{p1}$ stored in the registers $x''_S$ and $y''_S$. These selected values $m \cdot x_{p1}$ and $m \cdot y_{p1}$ are fed back to adders 255, 265 which produce the sums $m \cdot x_{p1}+f_u$ (i.e., $m \cdot [x_{p1}+(x_{p2}-x_{p1})/(y_{p2}-y_{p1})]$) and $m \cdot y_{p1}+f_v$ (i.e., $m \cdot [y_{p1} \pm 1]$). The drawing processor 132 outputs control signals to the multiplexers 253, 263 and registers 257, 267 for storing the sums $m \cdot x_{p1}+f_u$ and $m \cdot y_{p1}+f_v$ in registers $x_S$, $y_S$, respectively. These values constitute the edge walking on the first triangle edge to determine the far end point for span expansion on the current row $m \cdot y_{p1}+f_v$.

(d) On cycle four, the drawing processor outputs a control signal to the multiplexer 259 for selecting the contents of register $x''_S$, namely, $m \cdot x_{p1}+f_u$. The drawing processor 132 outputs Xres to circuit 272 and bsad to adder 274. Thus, the circuit 272 outputs $m \cdot x_{p1}+f_u+\text{Xres} \cdot m \cdot y_{p1}+f_v$ and the adder 274 outputs $m \cdot x_{p1}+f_u+\text{Xres} \cdot m \cdot y_{p1}+f_v+\text{bsad}$. The drawing processor 132 also outputs control signals to the multiplexer 276 and the register 278 for selecting the output of the adder 274 and for loading the selected value $m \cdot x_{p1}+f_u+\text{Xres} \cdot m \cdot y_{p1}+f_v+\text{bsad}$ into the register 278. On cycle five, this value is outputted to the drawing processor 132.

To perform step (3), the following substeps (e)–(g) are performed:

(e) On cycle three, the drawing processor 132 outputs control signals to the multiplexers 238, 248 for selecting the contents of the registers $x_S,y_S$, namely, $x_{p1},y_{p1}$. These values are fed back to the adders 234, 244. The drawing processor 132 also loads the value $\Delta x=(x_{p3}-x_{p1})/(y_{p3}-y_{p1})$ into the adder 234 and the value $\Delta y=1 \text{ sign}(y_3-y_1)$ into the adder 244. Thus, the adders 234, 244 output the values $x_{p1}+\Delta x=x_{p1}+(x_{p3}-x_{p1})/(y_{p3}-y_{p1})$ and $y_{p1}+\Delta y=y_{p1} \pm 1$ to the multiplexers 232, 242. The drawing processor 132 outputs control signals to the multiplexers 232, 242 and the registers 236, 246 for selecting the sums $x_{p1}+\Delta x$ and $y_{p1}+\Delta y$ for storing them in the registers $x_S,y_S$.

(f) On cycle four, the drawing processor 132 outputs control signals to the multiplexers 238, 248 for selecting the contents of the registers $x_S=x_{p1}+\Delta x$ and $y_S=y_{p1}+\Delta y$ for output as x',y'. The drawing processor 132 also outputs a control signal to the swapping circuit 252 for disabling swapping. The value x' is therefore multiplied with m in the multiplier 251 and inputted to the multiplexer 253. Likewise, the value y' is multiplied with m in the multiplier 261 and inputted to the multiplexer 263. The drawing processor 132 outputs control signals to the multiplexers 253, 263 and the registers 257, 267 for storing the values $m \cdot x',m \cdot y'$ in the registers $x''_P,y''_P$.

(g) On cycle five, the drawing processor 132 outputs control signals to the multiplexers 259,269 for selecting the contents of the registers $x''_P,y''_P$, namely, $x'=m \cdot (x_{p1}+\Delta x),y'=$ m·($y_{p1}$+Δy) to be outputted as x",y". The drawing processor 132 also outputs the values Xres to the circuit 272 and bsad to the adder 274. This causes the value x"+Xres·y"+bsad= m·($x_{p1}$+Δx)+Xres·m·($y_{p1}$+Δy)+bsad to be outputted to the multiplexer 276. The drawing processor 132 illustratively outputs control signals to the multiplexer 276 and 278 for selecting the value x' and storing this value in the register 278. On cycle six, the value m·($x_{p1}$+Δx)+Xres·m·($y_{p1}$+Δy) +bsad, corresponding to the near point of the current row of the triangle (on the second triangle edge), is outputted to the drawing processor 132.

The performance of step (4) is now discussed. Using the near edge and far edge points, the drawing processor 132 determines how many block transfers and how many pixel-by-pixel transfers to perform in order to achieve the span expansion. For instance, the drawing processor 132 may simply subtract the near edge column value (outputted on cycle six) from the far edge column value (outputted on cycle five) and divide this difference by the number of bits in a block transfer using integer division. This produces a quotient representing the number of block transfers and a remainder representing the number of pixel-by-pixel transfers.

Assume that on cycle seven the drawing processor 132 determines that a lock transfer of 128 bits (e.g. 64 bits/block transfer wherein the data is interleaved over two VRAM banks in the frame buffer) should be performed. Since the correct linear address ladd is already present in the register 278, this value can be outputted immediately for performing the block transfer (or even for performing a pixel transfer). Meanwhile, on cycle seven, the value of x' stored in register x"$_P$, namely, m·($x_{p1}$+Δx) (representing the near point on the second triangle edge) is outputted to the adder 255. Because a block transfer is performed, the drawing processor 132 outputs the value $f_u$=16 (64 bit transfer, two VRAM bank interleaving) to the adder 255. The adder 255 therefore produces the sum x'+$f_u$=m·($x_{p1}$+Δx)+$f_u$. The drawing processor 132 outputs control signals to the multiplexer 253 and registers 257, for storing this new x"=x'+$f_u$=m·($x_{p1}$+Δx)+$f_u$ value in the register x"$_P$.

On cycle eight, the drawing processor 132 outputs control signals to the multiplexer 259 and 269 for selecting the values stored in the registers x"$_P$=x'+$f_u$=m·($x_{p1}$+Δx)+$f_u$ and y"$_P$=m·($y_{p1}$+Δy) as x",y". The circuit 272 outputs the value x"+Xres·y"=m·($x_{p1}$+Δx)+$f_u$+Xres·m·($y_{p1}$+Δy) to the adder 274. The adder 274 outputs the value x"+Xres·y"+bsad=m·($x_{p1}$+Δx)+$f_u$+Xres·m·($y_{p1}$+Δy)+bsad. The drawing processor 132 outputs control signals to the multiplexer 276 and register 278 for storing this value x"+Xres·y"+bsad=m·($x_{p1}$+Δx)+$f_u$+Xres·m·($y_{p1}$+Δy)+bsad. On cycle nine, the value x"+Xres·y"+bsad stored in the register 278 may be used to perform a block transfer or a pixel-by-pixel transfer, whichever is required.

Suppose the very next transfer is a pixel by pixel transfer. The steps performed on cycles seven through nine are similarly performed except that the drawing processor 132 outputs a different value of $f_u$, e.g., 2 bytes, to the adder 255 in step seven. The span expansion is otherwise similar to that described above and is therefore not repeated.

When the span expansion is completed for the current row, edge walking is performed on the far edge (first or third edge) and near edge (second or third edge) of the triangle. The steps are very similar to those already described with the following modifications. First, the far endpoint for the far edge of the last row is already stored in the register x"$_S$. Therefore, only substeps (c)–(d) need be performed. Likewise, the near endpoint for the near edge is already stored in register $x_S$. Therefore, only substeps (f)–(g) need be performed. Afterward step (4) may be performed.

In addition, in performing steps (2) and (3), either the end vertex of the near edge (with end vertices $x_{p1}$,$y_{p1}$ and $x_{p2}$,$y_{p2}$) or end vertex of the far edge (with end vertices $x_{p1}$,$y_{p1}$ and $x_{p3}$,$y_{p3}$) will be reached first. In such a case, edge walking must continue on the third edge instead. This is achieved by the drawing processor 132 outputting $f_u$=m·($x_{p3}$−$x_{p2}$)/($y_{p3}$−$y_{p2}$) and $f_v$=1·m·sign($y_{p3}$−$y_{p2}$) to adders 255, 265 (in the case that the end vertex of the far edge is reached first) or Δx=($x_{p2}$−$x_{p3}$)/($y_{p2}$−$y_{p3}$) and Δy=1·sign($y_{p2}$−$y_{p3}$) into the adders 234, 244 (in the case that the end vertex of the near edge is reached first).

D. Texture Mapping

The case of texture mapping requires additional processing than ordinary 2-D virtual coordinate to linear address conversion. This is because texture space is illustratively implemented with a RIP MAP or a MIP MAP. Both maps include the texture data, and plural successively more finely sub-sampled versions of the texture date. The sub-sampled versions of the texture data, or "maps", can be stored in memory in a variety of ways including the fashion disclosed in U.S. Pat. No. 5,222,205, the fashion disclosed in L. Williams, *Pyramidal Parametrics*, ACM COMP. GRAPH., vol. 17, no. 3, Jul., 1993, p.1–11, or the fashion disclosed in U.S. patent application Ser. No. 08/598,523 entitled "Rip Map/Mip Map Textured Address Generator." To map texture onto an object, one or more maps of comparable resolution are selected. If more than one map is selected, texture data is selected from the plural maps for each point and interpolated to provide the correct texture data. U.S. patent application Ser. No. 08/598,521, now U.S. Pat. No. 5,740,344 entitled "Texture Filter Apparatus for Computer Graphics System" teaches an efficient apparatus for interpolating texture data.

The operation of the address generator 136 for texture mapping is similar to that described above for line drawing, bitblt and triangle drawing (depending on whether the texture data is applied to a drawn line, triangle, or during a block transfer) with the following modifications. When texture data is read out of the texture mip map or rip map, the texture address generator circuit 280 is used. In other words, the x",y" outputted to the linear address circuit 230 are received at the texture address generator circuit 280. This circuit 280 produces the appropriate texture linear address which is outputted to the multiplexer 276. The drawing processor 132 outputs a control signal to the multiplexer 276 for selecting the texture linear address outputted from the texture address generator circuit 280. This address is then loaded into register 278 for output to the frame buffer 134.

Second, texture mapping can be performed contemporaneously with a bitblt operation. Such an operation may arise if an object in 2-D or 3-D space is moving on the screen, such as during a flight simulation or virtual reality application. Alternatively, an object may be moved between an off-screen memory, e.g., the main memory 114, and the memory which is refreshed on the screen, e.g., the frame buffer 134. In any event, it is often desirable to reapply texture data during a bitblt. To that end, all three registers $x_S$,$x_D$,$x_P$, x"$_S$, x"$_D$,x"$_P$, $y_S$,$y_D$,$y_P$ or y"$_S$,y"$_D$,y"$_P$ of each register bank 236, 257, 246 or 267 are used simultaneously. The registers $x_S$, x"$_S$, $y_S$ and y"$_S$ are used to refer to the source rectangle while reading the source rectangle pixel data out of memory. The registers $x_P$, x"$_P$, $y_P$ and y"$_P$ are used to refer to texture data while reading the texture data out of memory. Again, note that the texture address generator 280 is illustratively used to determine the texture linear address for reading the texture data out of memory. The source and texture data are combined. The registers $x_D, x''_D, y_D$ and $y''_D$ are then used while writing the combined data to the destination rectangle. The contemporaneous texture mapping/bitblt can be summarized as follows: Each row (column) of the source rectangle is read out one at a time. A corresponding row of texture data is read (or more than one corresponding rows of texture data read, and interpolated to produce a single texture row) out. The source row is combined with the texture row. The combined row is written to the destination rectangle. The process is repeated as necessary to complete the source rectangle.

E. Scaling/Shearing

Scaling is supported in conjunction with the bitblt operation. Since the operation is very similar to an ordinary bitblt, scaling is only briefly described.

Figure 6:
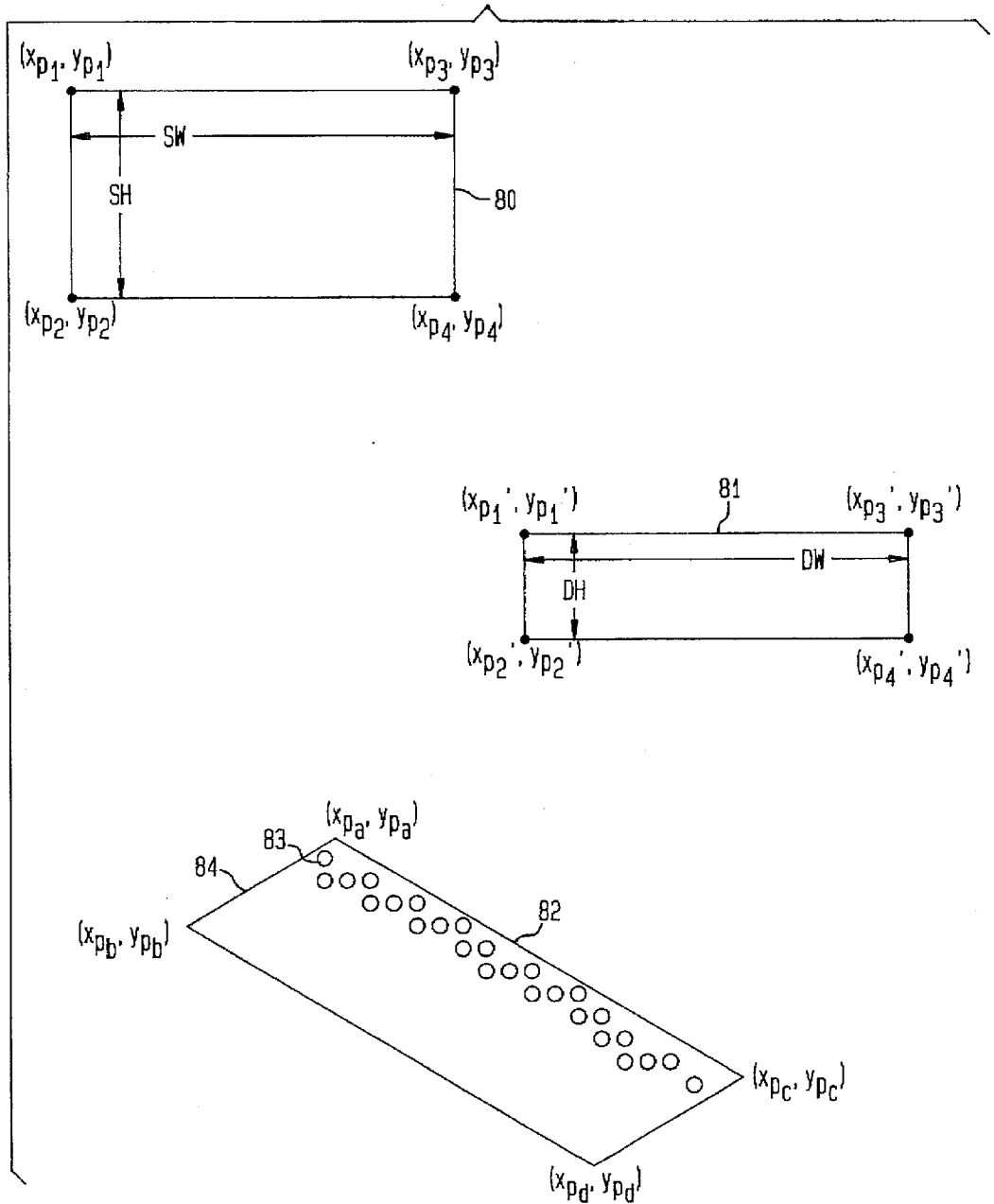
FIG. 6 illustrates scaling and shearing operations.

Illustratively, only pixel-by-pixel transfers are performed in conjunction with scaling. Consider the case shown in FIG. 6, where a rectangle 80 is to be moved/scaled to rectangle 81. The source rectangle has a width SW and a height SH whereas the destination rectangle has a width DW and a height DH. Therefore, every pixel in the destination rectangle 81 is formed from SW/DW by SH/DH pixels in the source rectangle 80. Therefore, every $(SW/DW)^{th}$ pixel of each $(SH/DH)^{th}$ row of the source rectangle 80 is transferred to form each pixel in each row of the destination rectangle 81. This is achieved by modifying the bitblt operation as follows. As before, the starting coordinates of the source rectangle 80 are loaded into registers $x_S, y_S$ and the starting coordinates of the destination rectangle 81 are loaded in registers $x_D, y_D$. The value $f_u = SH/DH$ is provided to the adder 255 of the span expansion circuit 220 for incrementing the source x coordinate. For incrementing the y coordinate of the source rectangle, the value $\Delta y = SW/DW$ is provided to the adder 244 of the edge walking circuit 210 at the appropriate time. The values $f_u = 1$ and $\Delta y = 1$ are provided to the adders 255 and 244 for processing the destination rectangle (because the calculations are normalized to the destination rectangle dimensions). As before, $\Delta x = f_v = 0$ for both source and destination.

Shearing involves additional considerations. Consider the source rectangle 80 and the destination parallelogram 82 of FIG. 6. The horizontal rows of the source rectangle 80 are to be written as diagonal lines in the destination parallelogram 82 which are parallel to the line between destination parallelogram vertices $x_{pa}, y_{pa}$ and $x_{pc}, y_{pc}$. The shearing operation is carried out by alternately reading-out a pixel data of a row of the source rectangle and writing the pixel data on the corresponding diagonal line position of the destination parallelogram. Both the reading-out and writing of the pixel data are performed using span expansion. The scale factors for determining which rows of pixels to read-out, and which pixels in each row to read-out, of the source rectangle are $\Delta y = SH/(y_{pb}-y_{pa})$ and $f_u = SW/(x_{pc}-x_{pa})$. Since the span expansion for reading out the pixel data of the source rectangle 80 is similar to that described above, the discussion below covers only the writing of data to the destination rectangle 81.

The generation of addresses for writing data to the destination parallelogram are as follows (assuming X-major order):

(1) edge walk on the near edge of the parallelogram, e.g., between vertices $x_{pa}, y_{pa}$ and $x_{pb}, y_{pb}$ to determine starting point of the next diagonal, (2) span expansion on diagonal using $f_v = (y_{pc}-y_{pa})/(x_{pc}-x_{pa})$ to effect slope of diagonal. For example, suppose the registers $x_D$ and $y_D$ of the registers 236, 246 store the coordinates of the first vertex, namely, $x_D = x_{pa}$ and $y_D = y_{pa}$. On cycle i, the drawing processor 132 outputs control signals for inputting the contents of $x_D$ and $y_D$ to the adders 234, 244 at the appropriate time. The drawing processor 132 also outputs the values $\Delta x = (x_{pb}-x_{pa})/(y_{pb}-y_{pa})$ and $\Delta y = 1 \cdot \text{sign}(y_{pb}-y_{pa})$ to the adders 234, 244. This causes edge walking on the edge between vertices $x_{pa}, y_{pa}$ and $x_{pb}, y_{pb}$, specifically, to the point $x' + \Delta x = x_{pa} + (x_{pb}-x_{pa})/(y_{pb}-y_{pa})$, $y' + \Delta y = y_{pa} + 1$. The drawing processor 132 outputs control signals to cause this value of x',y' to be stored in the registers $x_D, y_D$ on cycle i. On cycle i+1, the drawing processor 132 outputs control signals to the multiplexers 238, 248, swapping circuit 252 and multiplexers 253, 263 to cause the contents of registers $x_D, y_D$ to be outputted to the span expansion circuit 220, multiplied with m and stored in the registers $x''_D, y''_D$. On the cycle i+1, the drawing processor 132 can cause the contents $x'' = x' + \Delta x = x_{pa} + (x_{pb}-x_{pa})/(y_{pb}-y_{pa})$, $y'' = y' + \Delta y = y_{pa} \pm 1$ of registers $x''_D, y''_D$ to be outputted to the linear addressing circuit 230 to be converted into a linear address (as described above). Simultaneously, the drawing processor 132 can cause these values x",y" to be fed to adders 255, 265. The drawing processor 132 outputs the values $f_u = 1 \cdot m$ and $f_v = m \cdot (x_{pc}-y_{pa})/(x_{pc}-x_{pa})$ to the adders 255, 265 to produce the sums $x'' + f_u$ and $y'' + f_v$. The drawing processor 132 then outputs control signals to multiplexers 253, 263 and registers 257, 267 for storing the values $x'' + f_u, y'' + f_v$ in the registers $x''_D, y''_D$. The address generator 136 can then switch to reading out the next pixel data of the source rectangle 80 using the coordinates of the next source rectangle 80 pixel data which are illustratively stored in the registers $x''_S, y''_S$.

F. Mirror Image

The mirror image function can be accommodated by the swapping circuit 252. Consider an object which is drawn on the screen. The object is redrawn on the screen using the same coordinates. However, the drawing processor 132 (FIG. 7) first loads into the calculator circuit 272 Yres in place of Xres. The drawing processor 132 (FIG. 7) then outputs a swapping control signal for enabling the swapping of the x' and y' values. This causes the value x" to be equal to m·y' and y" to be equal to m·x'. The linear address circuit therefore computes the linear address:

bsad+y"+x"·Yres

The net effect is that the object is redrawn in a symmetrical fashion with respect to the axis x=y.

In short, an address generator is disclosed for performing 2-D virtual coordinate to linear physical memory address conversion. The address generator has an edge walking circuit which receives a 2-D virtual coordinate of a first pixel on a first edge of an object displayed on the display screen. The edge walking circuit selectively outputs a 2-D virtual coordinate of a second pixel which intercepts the first edge of the object at an adjacent pixel row or column to the first pixel. The address generator also has a span expansion circuit which receives the 2-D virtual coordinate of the second pixel. The span expansion circuit selectively expands the 2-D virtual coordinate of the second pixel, according to the number of bits used to represent each pixel and the amount of information which can be accessed at a time from memory. This produces first and second expanded coordinates of the second pixel. Furthermore, the address generator has a linear address circuit which receives the first and second expanded coordinates of the second pixel. The linear address circuit outputs a linear physical address of the second pixel in memory.

Finally, the above discussion is intended to be merely illustrative. Those having ordinary skill in the art may devise numerous alternative embodiments without departing from the spirit and scope of the following claims.

The claimed invention is:

1. An address generator for converting a two dimensional virtual coordinate, on a display screen of a display device, of a pixel to a linear physical address, in a memory, comprising:

an edge walking circuit, receiving a two-dimensional virtual coordinate of a first pixel on a first edge of an object displayed on said display screen, and selectively outputting a two dimensional virtual coordinate of a second pixel which intercepts said first edge of said object at an adjacent row to that of said first pixel, a span expansion circuit, receiving said two-dimensional virtual coordinate of said second pixel, and selectively expanding said two-dimensional virtual coordinate of said second pixel, according to the number of bits used to represent each pixel and the amount of information which can be accessed at a time from said memory, to produce first and second expanded coordinates of said second pixel, and a linear address circuit, receiving said first and second expanded coordinates of said second pixel and outputting a linear physical address of said second pixel in a memory, wherein pixels displayed on said screen are sequentially stored in said memory at linear addresses beginning with the lowest two-dimensional virtual coordinate of said display screen and ending with the highest two-dimensional virtual coordinate of said display screen.

2. The address generator of claim 1 wherein said edge walking circuit comprises:

a first adder circuit for adding a first slope component of said first edge to a first one of said two-dimensional virtual coordinates of said first pixel, a second adder circuit for adding a second slope component of said first edge to a second one of said two-dimensional virtual coordinates of said first pixel, a first multiplexer, for selecting as a first one of said two-dimensional virtual coordinates of said second pixel either said first coordinate of said first pixel or a sum outputted by said first adder circuit, and a second multiplexer, for selecting as a second one of said two-dimensional virtual coordinates of said second pixel either said second coordinate of said first pixel or a sum outputted by said second adder circuit.

3. The address generator of claim 2 wherein said edge walking circuit further comprises:

a first plurality of registers for storing said first coordinate of said second pixel outputted by said first multiplexer, a second plurality of registers for storing said second coordinate of said second pixel outputted by said second multiplexer, a third multiplexer for selecting said first coordinate stored in one of said first plurality of registers for output from said edge walking circuit, and a fourth multiplexer for selecting said second coordinate stored in one of said second plurality of registers for output from said edge walking circuit.

4. The address generator of claim 2 wherein span expansion circuit comprises:

a swapping circuit, receiving said first and second coordinates of said second pixel from said edge walking circuit and a control signal, for swapping said first and second coordinates depending on said control signal, a first multiplier for multiplying a first factor, which depends on said number of bits used to represent each pixel, with either said first coordinate or said second coordinate, depending on said swapping of said swapping circuit, to produce a first product, a second multiplier for multiplying said first factor with either said second coordinate or said first coordinate, depending on said swapping of said swapping circuit, to produce a second product as a second expanded coordinate, a third adder circuit for adding a second factor, which depends on said amount of information which can be accessed at a time from said memory, to said first product, and fifth multiplexer for selecting, as a first expanded coordinate, either said first product or the output of said third adder.

5. The address generator of claim 4 wherein said span expansion circuit further comprises:

a third plurality of registers, for storing the output of said fifth multiplexer, a fourth plurality of registers, for storing said second product, a sixth multiplexer, for selecting the value stored in one of said third plurality of registers for output from said span expansion circuit, and a seventh multiplexer, for selecting the value stored in one of said fourth plurality of registers for output from said span expansion circuit.

6. The address generator of claim 4 wherein said linear address circuit comprises:

a calculator circuit for multiplying said second expanded coordinate by the number of pixels in a particular direction between opposing edges of said display screen to produce a third product and adding to said third product said first expanded coordinate and a base address to produce said linear physical address of said second pixel.

7. A method for drawing a line on a display screen given the starting point and ending point two-dimensional virtual coordinates of said line on said display screen comprising the steps of:

(a) storing first and second coordinate values as first and second coordinates of said two-dimensional virtual coordinate of said starting point of said line to be drawn on a display screen in first and second registers, respectively, of an edge walking circuit, (b) using a linear address circuit, determining a linear address of said starting point of said line in a physical memory from said first and second coordinates, (c) until an ending point of said line is reached:

(c)(1) until a last point that intercepts said line, having said second coordinate value stored in said second register as said second coordinate, is reached:

(c)(1)(i) using a first adder, adding said first coordinate to a first slope component to produce a modified first coordinate, (c)(1)(ii) storing said modified first coordinate in said first register, and (c)(1)(iii) using a linear address circuit, determining a linear address of said modified first coordinate and said second coordinate in a physical memory, (c)(2) using a second adder, adding said second coordinate to a second slope component to produce a modified second coordinate, and (c)(3) storing said modified second coordinate in said second register, wherein pixels displayed on said screen are sequentially stored in said memory at linear addresses beginning with the lowest two-dimensional virtual coordinate of said display screen and ending with the highest two-dimensional virtual coordinate of said display screen.

8. A method for moving a source rectangle of pixels to a destination rectangle of pixels comprising the steps of:

(a) storing in first and second registers of a span expansion circuit, first and second values which depend on an amount of data used to represent each pixel and first and second virtual coordinates of a starting point of a near edge of source rectangle on a display screen, (b) until a far edge, opposite to said near edge of said source rectangle is reached:

(b)(1) using said first and second values stored in said first and second registers, determining a linear address in a memory, (b)(2) reading out the bits of at least one pixel from said linear address in said memory, (b)(3) using an adder of said span expansion circuit, adding the amount of data read out by said step (b)(2) to said first value and storing the output of said adder as said first value in said first register, (c) if the endpoint of the source rectangle is not reached, storing in said second register, a value which depends on the second virtual coordinate of the point adjacent to said source rectangle starting point on said near edge of said source rectangle, wherein pixels displayed on said screen are sequentially stored in said memory at linear addresses beginning with the lowest two-dimensional virtual coordinate of said display screen and ending with the highest two-dimensional virtual coordinate of said display screen.

9. The method of claim 8 further comprising the steps of: performing a block transfer to read out a predefined amount of data for more than one pixel if the amount of data of said pixels between the pixel corresponding to said linear address, and a pixel on said far edge to be read out is less than said predefined amount of data, and otherwise, reading out a second predefined amount of data which is less than or equal to the total amount of data per pixel.

10. The method of claim 8 further comprising, alternately with said steps (a)–(c), the steps of:

(a) storing in third and fourth registers of a span expansion circuit, third and fourth values which depend on an amount of data used to represent each pixel and first and second virtual coordinates of a starting point of a near edge of a destination rectangle on a display screen, (b) until a far edge, opposite to said near edge of said destination rectangle is reached:

(b)(1) using said third and fourth values stored in said third and fourth registers, determining a linear address in a memory, (b)(2) reading out the bits of at least one pixel from said linear address in said memory, (b)(3) using an adder of said span expansion circuit, adding the amount of data read out by said step (b)(2) to said third value and storing the output of said adder as said third value in said third register, (c) if the endpoint of the destination rectangle is not reached, storing in said fourth register, a value which depends on the second virtual coordinate of the point adjacent to said destination rectangle starting point on said near edge of said destination rectangle.

11. A method for drawing triangle, which has first, second and third vertices, a first edge between said first and second vertexes, a second edge between said first and third vertices and a third edge between said third and second vertices, said method comprising the steps of:

(a) storing first and second coordinates of said first triangle vertex in first and second registers of an edge walking circuit, (b) storing first and second values which depend on said first and second coordinates and an amount of data used to represent each pixel in first and second registers of a span expansion circuit, (c) using a first adder of said span expansion circuit, adding a value which depends on a first slope component of said first edge, and said amount of data used to represent each pixel, to said first value to produce a first sum, (d) storing said first sum as said first value in said first register of said span expansion circuit, (e) using a second adder of said span expansion circuit, adding a value which depends on a second slope component of said first edge, and said amount of data used to represent each pixel, to said second value to produce a second sum, (f) storing said second sum as said second value in said second register of said span expansion circuit, (g) using a first adder of said edge walking circuit, adding a first slope component of said second edge to said first coordinate to produce a third sum, (h) storing said third sum as said first coordinate in said first register of said edge walking circuit, (i) using a second adder of said edge walking circuit, adding a second slope component of said second edge to said second coordinate to produce a fourth sum, (j) storing said fourth sum as said second coordinate in said second register of said edge walking circuit, (k) storing in third and fourth registers of said span expansion circuit, third and fourth values which depend on said third and fourth sums and an amount of data used to represent each pixel in first and second coordinates of a span expansion circuit, (l) until a point on said first edge corresponding to said first and second values stored in said first and second registers of said span expansion circuit is reached:

(l)(1) using said third and fourth values stored in said third and fourth registers of said span expansion circuit, determining a linear address in a memory, (l)(2) reading out the bits of at least one pixel from said linear address in said memory, (l)(3) using said first adder of said span expansion circuit, adding the amount of data read out by said step (l)(2) to said third value and storing the output of said adder as said third value in said third register wherein pixels displayed on said screen are sequentially stored in said memory at linear addresses beginning with the lowest two-dimensional virtual coordinate of said display screen and ending with the highest two-dimensional virtual coordinate of said display screen.

12. A method for converting a two dimensional virtual coordinate, on a display screen of a display device, of a pixel to a linear physical address, in a memory, comprising:

- using an edge walking circuit, receiving a two-dimensional virtual coordinate of a first pixel on a first edge of an object displayed on said display screen, and selectively outputting a two dimensional virtual coordinate of a second pixel which intercepts said first edge of said object at an adjacent row to that of said first pixel,

- using a span expansion circuit, receiving said two-dimensional virtual coordinate of said second pixel, and selectively expanding said two-dimensional virtual coordinate of said second pixel, according to the number of bits used to represent each pixel and the amount of information which can be accessed at a time from said memory, to produce first and second expanded coordinates of said second pixel, and

- using a linear address circuit, receiving said first and second expanded coordinates of said second pixel and outputting a linear physical address of said second pixel in a memory,

- wherein pixels displayed on said screen are sequentially stored in said memory at linear addresses beginning with the lowest two-dimensional virtual coordinate of said display screen and ending with the highest two-dimensional virtual coordinate of said display screen.

* * * * *